(12) United States Patent
Ishida et al.

(10) Patent No.: US 6,909,444 B2
(45) Date of Patent: Jun. 21, 2005

(54) TRANSFER RIBBON, IMAGE EXPRESSING MEDIUM AND METHOD FOR PRODUCTION OF THEM

(75) Inventors: Tadahiro Ishida, Tokyo (JP); Fumihiko Mizukami, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 63 days.

(21) Appl. No.: 10/658,694

(22) Filed: Sep. 9, 2003

(65) Prior Publication Data

US 2004/0080606 A1 Apr. 29, 2004

(30) Foreign Application Priority Data

Sep. 9, 2002 (JP) ........................................ 2002-263107
Sep. 9, 2002 (JP) ........................................ 2002-263108

(51) Int. Cl.[7] ................................................. B41J 2/38
(52) U.S. Cl. ....................................................... 347/187
(58) Field of Search ................................. 347/187, 213, 347/215, 218, 101, 102, 103; 400/120.01; 101/485

(56) References Cited

U.S. PATENT DOCUMENTS 5,801,236 A * 9/1998 Kamb ..................... 536/24.31
6,317,149 B1 * 11/2001 Mochida et al. ............. 347/173
6,540,345 B1 * 4/2003 Wagner et al. ............... 347/103
6,655,287 B2 * 12/2003 Jojima et al. ................ 101/485

* cited by examiner

Primary Examiner—K. Feggins
(74) Attorney, Agent, or Firm—Timothy J. Keefer; Seyfarth Shaw LLP

(57) ABSTRACT

The invention provides a transfer ribbon having a layered structure in which a substrate, a relief layer and a reflection layer are laminated in this order, wherein the relief layer comprises an ionizing radiation-cured resin. The transfer ribbon can precisely transfer fine dots and/and dots placed close to each other with a low energy and at a high speed without any of burrs, chippings or lacks by means of a thermal head. Also, the invention provides an image expressing medium, which can be produced using the transfer ribbon described above, and comprises a support, a color layer and plural dots of relief hologram and/or diffraction grating. In the medium: the color layer and the dots are disposed on the same surface of the support; and the each dot has an area in a range from 0.0001 to 0.09 mm$^2$; the each dots has a diffraction direction different from that of at least one of adjacent dots, or the dot has two or more sections each of which has a diffraction direction different from each other. The image expressing medium exhibits specially decorative effects such as a lame-like effect.

20 Claims, 6 Drawing Sheets

A-A section

TRANSFER RIBBON, IMAGE EXPRESSING MEDIUM AND METHOD FOR PRODUCTION OF THEM

BACKGROUND OF THE INVENTION

1. Field of the Invention

The present invention relates to a transfer ribbon and a method for production of the transfer ribbon, and particularly relates to a transfer ribbon which has a transferable layer (relief layer) with a relief structure such as hologram and/or diffraction grating and is available for transferring the relief layer in a fine pattern by means of a thermal head, and a method of production of such a transfer ribbon.

The present invention also relates to an image expressing medium and a method for production thereof, and particularly relates to an image expressing medium having an image which contains plural dots of the relief layer transferred from the above described transfer ribbon and can exhibit a lame-like glittering effect based on the dots, and a method of production of such an image expressing medium.

2. Description of the Related Art

A transfer ribbon (transfer foil) provided with a transferable layer having relief structures such as holograms or diffraction gratings can print and express specially decorated images or three-dimensional images, and it can also produce a printed product hard to be forged or duplicated because the hologram and the diffraction grating require high technology for producing themselves and they are therefore difficult to be produced.

For example, the transfer ribbons are available for making cards such as credit card, ID card, prepaid card or the like from the viewpoint of preventing forgery or duplicate, and further available for making ticket- or bill-like papers such as gift certificate, check, commercial paper, bond paper, stock certificate, admission ticket or some other certificates particularly from the viewpoint of impossibility in reproducing of the hologram and the diffraction grating with the use of a multicolor-copying machine. Moreover, because of the visually special effects of the relief, other applications include packaging materials, books, notes, brochures, pamphlets, POPs (point of purchase) or the like.

A method for transferring or printing a relief layer by use of a transfer ribbon is well known as a way to add or fix the relief structures such as holograms or diffraction gratings on articles. In general, the transfer ribbon is composed of at least a substrate and respective layers of a peelable layer, a relief layer having patterns such as holograms and diffraction gratings, a reflection layer and an adhesive layer, which are successively laminated in this order on a substrate. Common methods for transferring or printing by the transfer ribbon include a hot stamping method (also called "ribbon pressing" or "foil pressing") or a thermal transfer method by a heating roller. In the hot stamping method or the thermal transfer method using the heating roller, the transfer ribbon is positioned between a heated metal stamp or roller and a transfer-receiving material, and the transfer ribbon is pressed on the transfer-receiving material with the stamp or the roller, and then substrate of the ribbon is peeled off. However, the hot stamping method and the thermal transfer method using the heating roller cause a problem of difficulty in precise transfer of fine patterns such as dots having minute areas smaller than several millimeter square ($mm^2$) or dots being present close to each other. A method to form such fine patterns includes an etching method, but it requires many processes so that it takes longer time and much cost.

Recently, a thermal printer equipped with a thermal head capable of easily expressing, through a transferring process, dots with minute areas or dots being present close to each other has been commercially available, and a heat melting type or dye-sublimating type ink ribbon is used therein.

The Japanese patent application Laid open (JP-A) No. Heisei 11(1998)-227368 discloses a method to transfer dot patterns by means of a thermal head. Applicable range of this invention is however restricted to the case of forming dots lager than a certain area, and this fact suggests presence of considerable difficulty in expression of fine patterns. Moreover, conventional transfer ribbons have low sensitivity toward instantaneous heating by a thermal head, so that they provide very low printing speed and further provide faults of causing lacks or chipping of the dots to be transferred on a transfer-receiving material or causing burrs, that is, layers being transferred and left in areas between the dots on the transfer-receiving material. The above mentioned JP-A No. Heisei 11(1998)-227368 teaches or suggests no method to solve these problems for improvement of the transfer ribbons.

The Japanese patent application Laid open (JP-A) No. 2001-315472 discloses a method to make glittering image by transferring relief layers in multiplies form with the use of several transfer ribbons with different diffraction directions each other. However, the above mentioned method requires a number of transfer ribbons and multiple transfer processes. In addition, a conventional transfer ribbon is involved with a fault of considerable difficulty in transferring fine dots without causing burrs and lacks of dots.

SUMMARY OF THE INVENTION

The present invention is attained in order to solve the above mentioned problems.

A first object of the present invention is to provide a transfer ribbon which can transfer dots having minute area or dots closing with each other without any burr, lack nor chipping of dots even by using a thermal head of a thermal printer.

A second object of the present invention is to provide a method for production of the transfer ribbon mentioned above.

A third object of the present invention is to provide an image expressing medium in which color layers forming images or patterns are present on a support of the image expressing medium and plurality of fine dots of relief holograms or diffraction gratings is transferred to the same support, so that a visually unique decoration-effect such as lame-like effect can be caused by association of the color layers and plurality of fine dots.

A forth object of the present invention is to provide a method for production of the image expressing medium mentioned above.

In order to achieve the above object, a first aspect of the present invention provides a transfer ribbon comprising a substrate, a relief layer having a surface configuration of relief patterns and a reflection layer, wherein the substrate, the relief layer and the reflection layer are disposed on the substrate in this order, and the relief layer comprises an ionizing radiation-cured resin.

The transfer ribbon of the first aspect can transfer dots having minute areas or dots arranged close to each other without any problems such as burrs, lacks and chipping of dots even in a case of using a thermal printer provided with a thermal head.

In order to control transferability of the relief layer, it is preferable to add a peelable layer comprising the substantially same ionizing radiation-cured resin as that of the relief layer so as to dispose the peelable layer between the substrate and the relief layer.

In order to control adhesiveness of the peelable layer present between the substrate and the relief layer, it is preferable that the peelable layer further comprises a thermoplastic resin.

It is preferable that the peelable layer may comprise 90 to 99.9% by weight of the ionizing radiation-cured resin and the 0.1 to 10% by weight of the thermoplastic resin.

It is preferable that the thermoplastic resin may comprise at least one resin selected from the group consisting of polyester resins and copolymer resins containing a monomer unit derived from vinyl chloride and/or vinyl acetate.

The provision of the peelable layer or the adjusting of a composition of the peelable layer enables the transfer ribbon to transfer precise dots at a high speed with a low energy.

It is preferable that a heat resistant layer is disposed on the opposite side of the substrate to the side having the relief layer.

The provision of the heat resistant layer enables the transfer ribbon to transfer precise dots at a high speed even when a transfer ribbon has a thin substrate and a thermal transfer process is carried out using a thermal head.

It is preferable that an adhesive layer is further disposed on the reflection layer.

The transfer ribbon having the adhesive layer improves transferability even when a transfer receiving material has no adhesive layer on its top surface.

The first aspect of the present invention also provides a method for production of the transfer ribbon described above, which comprises steps of:

(a) forming a relief forming layer comprising an ionizing radiation-curable resin on the substrate, (b) forming a surface of the relief forming layer into the relief patterns, (c) converting the relief forming layer to the relief layer by irradiating and curing the relief forming layer with an ionizing radiation, and (d) forming the reflection layer on the relief layer.

In one embodiment, the above mentioned method may be modified so as that a peelability-potential layer comprising the substantially same ionizing radiation-curable resin as that of the relief forming layer and a thermoplastic resin is formed on the substrate prior to the step (a), the relief forming layer is formed on the peelability-potential layer in the step (a), and the peelability-potential layer is converted to a peelable layer as well as conversion from the relief forming layer to the relief layer by irradiating and curing the peelability-potential layer and the relief forming layer with an ionizing radiation in the step (c).

In order to secure low and stable peel strength, it is preferable for the ionizing radiation to use an ultraviolet ray substantially having a wavelength only in a range longer than 300 nm.

A second aspect of the present invention provides an image expressing medium comprising a support, a color layer and plural dots of relief hologram and/or diffraction grating, the color layer and the dots being disposed on the same surface of the support, wherein the dots has a layered structure comprising a reflection layer and a relief layer having a surface configuration of relief patterns, the each dot has an area in a range from 0.0001 to 0.09 mm$^2$, and has a diffraction direction (diffraction angle) different from that of at least one of adjacent dots or two or more sections each of which has a diffraction direction different from each other.

The image expressing medium of the second aspect can exhibits a visually unique decoration-effect such as lame-like effect by association of the color layers and plurality of fine dots. That is the color layers forming images or patterns are present on a support of the image expressing medium and plurality of fine dots of relief holograms or diffraction gratings is transferred to the same support, so that a visually unique decoration-effect is caused on the image expressing medium.

In the second aspect, two or more kinds of the dots different in area may be present on the image expressing medium, or the dots may be arranged with a gradient in a density of the dots.

A frame of an image such as pattern or photograph on the image expressing medium can be made so as to have gradation design or various figures depending on arrangement and/or combination of dots, so that the image expressing medium can exhibits visual designs with particularly high quality such as lame-like glittering effect.

The second aspect of the present invention also provides a method for production of the image expressing medium described above, which can be produced with the use of the transfer ribbon of the first aspect, and it comprises steps of:

providing a support provided with a color layer disposed on a surface of the support, providing a transfer ribbon in which a relief layer having a surface configuration of relief patterns and a reflection layer are disposed on a substrate in this order, and the relief layer comprises an ionizing radiation-cured resin, subjecting the support to thermal transfer with the use of the transfer ribbon by means of a thermal head to form plural dots of relief hologram and/or diffraction grating on the same surface where the color layer is disposed on so as that the each dot has a layered structure comprising a reflection layer and a relief layer, and has an area in a range from 0.0001 to 0.09 mm$^2$, and has a diffraction direction different from that of at least one of adjacent dots or two or more sections each of which has a diffraction direction different from each other.

Each numerical symbol means as follows:

1: transfer ribbon; 11: substrate; 13: peelable layer; 15: relief layer; 17: reflection layer; 19: adhesive layer; 21: heat resistant layer; 100: support; 101: dot; 103, 1103A and 103B: color layer; 105: image expressing medium.

DETAILED DESCRIPTION OF THE PREFERRED EMBODIMENTS

The transfer ribbon of the present invention will be described in detail with reference to the drawings.

Figure 1:
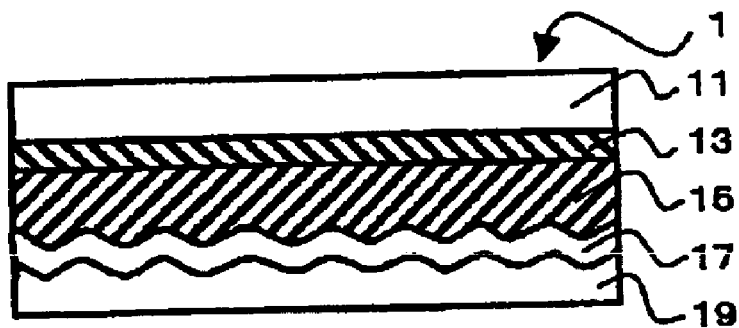
FIG. 1 is a schematic sectional view showing an example of a transfer ribbon of the present invention.
Figure 2:
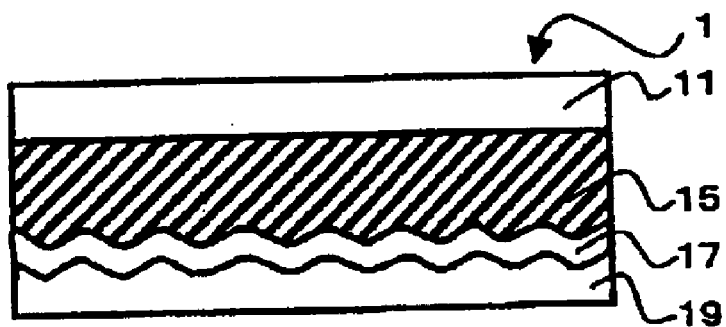
FIG. 2 is a schematic sectional view showing an example of a transfer ribbon of the present invention.
Figure 3:
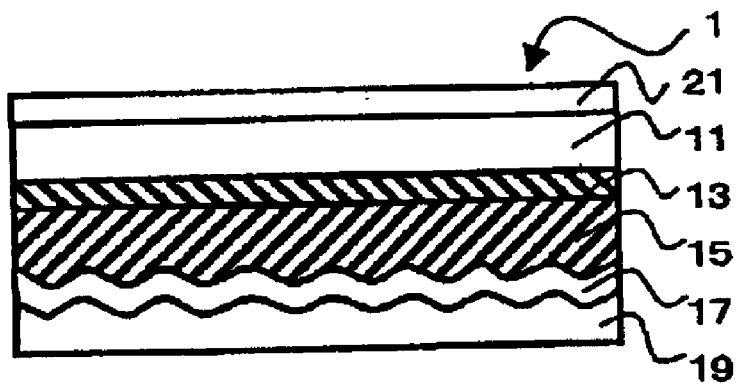
FIG. 3 is a schematic sectional view showing an example of a transfer ribbon of the present invention.

FIGS. 1, 2 and 3 are schematic sectional views showing examples of transfer ribbons of the present invention respectively.

Layered Structure:

The transfer ribbon 1 of the present invention comprises layers on a surface of a substrate 11: a peelable layer 13, a relief layer 15, a reflection layer 17 and an adhesive layer 19 in this order. An adhesive layer can be formed on a transfer-receiving material, in such a case, the adhesive layer 19 can be omitted from the transfer ribbon 1. But generally an adhesive layer is formed on a transfer ribbon. The following examples of the transfer ribbon 1 are in the form having the adhesive layer 19. As shown in FIG. 3, a heat resistant layer 21 may be formed on the opposite side of the substrate 11 to the side having relief layer 15. As shown FIG. 2, a transfer ribbon 1 permits no presence of the peelable layer 13, and in such a case, the transfer ribbon 1 may have a relief layer 15 having functions as the peelable layer depending on a kind of the substrate 11.

Substrate:

Various materials can be used as substrate 11 depending on application fields insofar as the material has heat resistance against heating by a thermal head, mechanical strength bearing the stress on a producing process, resistance against attacking by solvents or the like.

For the substrate 11, examples of materials include: polyester resins such as polyethylene terephthalate, polybutylene terephthalate, polyethylene naphthalate, polyethylene terephthalate-isophthalate copolymer, terephthalic acid-cyclohexane dimethanol-ethyleneglycol copolymer, or a co-extrusion film consisting of polyethylene terephthalate/polyethylene naphthalate; polyamide resins such as Nylon 6, Nylon 66, Nylon 610 or the like; polyolefin resins such as polyethylene, polypropylene, polymethylpentene or the like; vinyl resins such as polyvinyl chloride; acrylic resins such as polyacrylate, polymethacrylate, and polymethylmethacrylate or the like; imide resins such as polyimide, polyamide imide, polyether imide or the like; engineering resin such as polyarylate, polysulfone, polyether sulfone, polyphenylene ether, polyphenylene sulfide (PPS), polyaramid, polyether ketone, polyether nitrile, polyether ether ketone, polyether sulphate or the like; polycarbonate; styrene resins such as polystyrene, high-impact polystyrene, AS resin ABS resin or the like; and, cellulose films such as cellophane, cellulose triacetate, cellulose diacetate nitrocellulose or the like.

The substrate 11 may be made of a copolymer or a mixed resin containing one or more resins exemplified above as major components. The mixed resin may be a polymer alloy. The substrate 11 may be a composite film having a laminated structure of these resins. Though either of an oriented film and a non-oriented film may be used as the substrate, it is preferable to use a mono-axial or bi-axial oriented film in order to improve its mechanical strength. Thickness of the substrate 11 is usually within the range from 2.5 $\mu$m to 50 $\mu$m, more preferably 2.5 $\mu$m to 12 $\mu$m, and still more preferably 4 $\mu$m to 6 $\mu$m. When the substrate has thickness over the range described above, thermal conduction from a thermal head to a transfer ribbon is lowered, and therefore it may cause difficulty in transferring of fine dots. On the other hand, when the substrate has thickness under the range described above, mechanical strength of the substrate may become insufficient.

A substrate to be used may be in a form of film, ribbon, or board, either of which has a mono- or multi-plied structure made of resin. A polyester film such as polyethylene terephthalate, polyethylene naphthalate or the like is preferably used in many cases because of its excellent heat resistance and good mechanical strength, and polyethylene terephthalate is particularly preferable. Prior to a coating process, a surface of the substrate 11 may be subjected to one or more pre-treatments for facilitating adhesion of a coating material to form layers. Examples of pre-treatments include corona discharge treatment, plasma treatment, ozone treatment, flame treatment, primer coating treatment (a treatment using anchor coating, adhesion-promoting agent, or adhesion-facilitating agent), preheat treatment, dust removing treatment, vapor-deposition treatment, and alkali treatment or the like. A material forming the substrate may contain one or more additives such as filler, a plasticizer, coloring agent, or antistatic agent as required.

As fillers, extenders such as silica, calcium carbonate or the like can be used. Disperse dyes are preferable as coloring agents, and examples thereof include monoazo, bisazo, anthraquinone, nitro, stylyl, methine, aroylene, benzimidazole, aminonaphthyl amide, naphthoquinone imide, or coumarin derivatives.

As antistatic agents, nonionic surface active agents, anionic surface active agents, cationic surface active agents, polyamide, acrylic acid derivatives or the like can be used.

Peelable Layer:

The peelable layer 13 is formed, as required, between the substrate 11 and the relief layer 15. The peelable layer 13 can be formed in such manner that: first, a coating material containing at least a ionizing radiation-curable resin which is substantially same as that to be used for forming the relief layer, and further containing, as required, one or more thermoplastic resins in order to control adhesiveness to the substrate 11, is applied to the substrate 11 to form a pre-cured layer of peelable layer 13 (namely, peelability-potential layer); and then, the peelability-potential layer is cured at an appropriate time by irradiation with ionizing radiation rays to be converted to the peelable layer 13. Usually, a curing process of the peelability-potential layer is carried out after forming a relief forming layer on the peelability-potential layer in order to cure and convert both of the peelability-potential layer and the relief forming layer at the same time.

The peelable layer 13 thus obtained fixes the relief layer 15 on the substrate 11 in a proper adhesion, and when the transfer ribbon is heated by a thermal head, the peelable layer 13 is easily peeled off from the substrate 11 and allow the relief layer 15 to be surely transferred to a transfer receiving material (a medium), whereby printing fine and precise dots.

That is, before the transfer process, the relief layer 15 does not peeled off from the substrate 11 of the transfer ribbon 1, even if the transfer ribbon undergoes vibration or impacts during carriage, transporting, handling or installing to a printer of the transfer ribbon. To the contrary, at the time of transfer-printing process, the peelable layer 13 facilitates the layers including the relief layer 15 to peel off from the substrate 11 and transfer to a transfer-receiving material.

If adhesive strength of the peelable layer 13 to the substrate 11 was not enough, the relief layer 15 is liable to peel off from the substrate 11 by vibrations or impacts during carriage, transporting, handling, or installing to a printer of the transfer ribbon, or a part of the transferred layers, namely "burrs of the relief layer 15", remains in a region between dots.

On the other hand, if content of thermoplastic resin is large amount, adhesive strength of the peelable layer 13 becomes too strong, and the layers including the relief layer 15 can not peel off and can not transfer from the substrate 11 at the time of a printing process.

In particular, when a thin substrate is used, the heat generated by a thermal head easily diffuses to regions of the adhesive layer 19 corresponding to non-transfer regions around dots so that the adhesive layer 19 becomes active over excessively wide regions. In such a case, the adhesive layer 19 adheres to the transfer-receiving material with an excessively large strength, and thus deteriorating sharpness of the edge or the boundary line of the transferred layer. To the contrary, when the peelability-potential layer is formed from a coating material containing the ionizing radiation-curable resin and an appropriate amount of the thermoplastic resin and cured the peelability-potential layer by irradiating with the ionizing radiation rays, the peelable layer 13 thus obtained adheres to the substrate 11 with a proper strength.

At the time of heat loading with a thermal head, the relief layer 15 and reflection layer 17 of the transfer ribbon present at regions to be released in a dot-like form are easily peeled off from the substrate 11 and transferred to a transfer-receiving material. However, the relief layer 15 and reflection layer 17 of the transfer ribbon present at non-transfer regions, namely regions around the dots, remain on the substrate 11, so that fine and precise dots can be printed without causing any burrs nor lacks of the dots. In this way, the present invention has been achieved.

Thermal influence from the thermal head is usually little when thickness of the substrate 9 $\mu$m or more, and tends to large when thickness of the substrate is 6 $\mu$m or less and, in particular, the thermal influence is often significant when thickness of the substrate is 4.5 $\mu$m or less.

That is, it is ideal that an activation of the adhesive layer 19 should be selectively caused at regions corresponding to the dots. However, when a thin substrate is used for the transfer ribbon, an activation of the adhesive layer 19 is liable to spread to regions not corresponding to the dots.

In the case of forming the peelable layer 13, it is preferable that the relief layer 15 is made of at least an ionizing radiation-cured resin but containing no thermoplastic resin, and the peelable layer 13 made of at least an ionizing radiation-cured resin and an appropriate amount of a thermoplastic resin. A preferable range of the content ratio, to the total weight of the peelable layer 13 is 90 to 99.9% by weight of the ionizing radiation-cured resin and 0.1 to 10% by weight of the thermoplastic resin.

It is preferable that the ionizing radiation-cured resin forming the peelable layer 13 or the ionizing radiation-curable resin to form the peelability-potential layer is the substantially same ionizing radiation-cured resin forming the relief layer 15 or the ionizing radiation-curable resin to form the relief forming layer. Herein, "substantially same ionizing radiation-curable resin" or "substantially same ionizing radiation-cured resin" means a resin that has same basic chain structure or same reactive mechanism. That is, "substantially same ionizing radiation-curable resin" or a resin having a relationship that its substitutional groups and/or chain length are different from those of the other resin to be compared with. For a calculation of the content ratio, the weight of the ionizing radiation-curable resin means the total amount of the ionizing radiation-curable resin itself and additional components other than the thermoplastic resin. Examples of additional components include reactive monomers to be reacted with the ionizing radiation-curable resin and additives such as releasing agents.

In one embodiment, the peelable layer 13 may be formed of the completely same ionizing radiation-cured resin of the relief layer 15 so as that the peelable layer 13 and the relief layer 15 is integrated into a substantially mono-layer.

In another embodiment, the peelable layer 13 may be formed of the substantially same, but slightly different, ionizing radiation-cured resin of the relief layer 15 so as that the peelable layer 13 and the relief layer 15 is integrated into a substantially mono-layer.

In both embodiments described above, a coating material for the peelable layer and a coating material for the relief layer may be applied on the substrate, simultaneously by a single process or individually by separate processes.

In the case of forming no peelable layer 13, the relief layer 15 is made of at least ionizing radiation-cured resin, but any thermoplastic resins is not incorporated with the ionizing radiation-cured resin.

Relief Layer and Relief Forming Layer:

The relief layer 15 is formed in such manner that: first, a coating material for the relief layer containing at least an ionizing radiation-curable resin is applied on the substrate 11 directly or through the peelability-potential layer to form a pre-cured layer of relief layer 15 (namely, relief forming layer); and then, the relief forming layer is cured by irradiation with ionizing radiation rays to be converted to the relief layer 15, which is made of at least an ionizing radiation-cured resin.

As an ionizing radiation-curable resin which is material for the relief forming layer, there may be exemplified epoxy modified acryl resin, urethan modified acryl resin, acrylic modified polyester or the like. Among these resins, the urethane modified acrylic resin is preferable, and an urethane modified acrylic resin represented by the following formula (1) is particularly preferable.

Formula 1

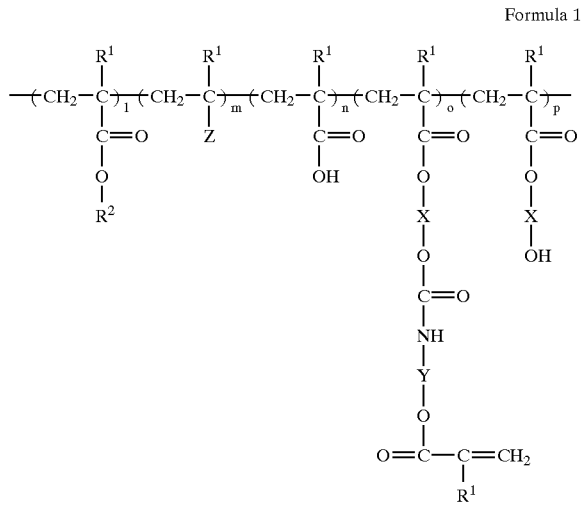

wherein, each of six substitutents $R^1$ is independently hydrogen atom or methyl, $R^2$ is hydrocarbon group having 1 to 16 carbons, X and Y are independently linear or branched alkylene group, and wherein, Z is a group (moiety) to change or modify properties of the resin, and examples thereof include a group capable of imparting releasability, a group having bulky structure, a cyclic hydrophilic group or the like. Supposing sum of l, m, n, o and p is 100, l is from 20 to 90, m is from 0 to 80, n is from 0 to 50, o+p is from 10 to 80, p is from 0 to 40.

A preferable example of the urethane modified acrylic resins represented by the formula (1) is a resin to be obtained in such a manner that: an acrylic copolymer is first prepared by copolymerizing 20 to 90 mol of methyl methacrylate, 0 to 50 mol of methacrylic acid, 10 to 80 mol of 2-hydroxy ethyl methacrylate and 0 to 80 mol of isobornyl methacrylate as "Z", and then hydroxyl groups in the resultant copolymer is reacted with methacryloiloxyethyl isocyanate (namely, 2-isocyanate ethyl methacrylate).

It is not necessary for the urethane modified acrylic resin mentioned above that all of hydroxyl groups present in its molecule have been reacted with methacryloiloxyethyl isocyanate. It may be enough if at least 10 mol %, and particularly 50 mol % or more of the hydroxyl groups derived from 2-hydroxy ethyl methacrylate unit in the copolymer have been reacted with methacryloiloxyethyl isocyanate.

For synthesizing of the resin, the other monomers having hydroxyl group may be used instead of, or in combination with the 2-hydroxy ethyl methacrylate mentioned above. Examples of the other monomers include N-methylolacryl amide, N-methylolmethacrylamide, 2-hydroxy ethyl acrylate, 2-hydroxy ethyl methacrylate, 2-hydroxy propyl acrylate, 2-hydroxy propyl methacrylate, 4-hydroxy butyl acrylate, 4-hydroxy butyl methacrylate or the like.

A resin composition for forming the relief forming layer can be prepared with the use of the above described resins as a main component, and preferably used is the urethane modified acrylic resins which is obtained by introducing plural methacryloyl groups in a molecule of a hydroxyl-contained acrylic resin so as to use reactivity of hydroxyl groups present in the hydroxyl-contained acrylic resin.

When a relief structure such as a diffraction grating is prepared with the use of the resin composition mentioned above, ionizing radiation rays such as ultraviolet rays or electron beams can be used as a curing method, and the composition makes it possible to form a relief structure with not only high density of cross-linkage but also excellent performances of, for example, heat resistance and/or flexibility.

To obtain the urethan modified acryl resins represented by the formula (1), first, the copolymer described above is dissolved to a solvent having good solubility to the copolymer such as toluene, ketones, cellosolve acetate, dimethylsulfoxide or the like. Then, while the solution is undergoing stir, methacryloyloxyethyl isocyanate is dropped into the solution to proceed a reaction. In this way, the isocyanate groups are reacted with the hydroxyl groups in the copolymer to form urethane bonds, thereby introducing the methacryloyl groups into the copolymer through the urethane bonds. When an amount of the methacryloiloxyethyl isocyanate to be used is expressed in terms of a ratio (NCO/OH) of isocyanate groups in the methacryloiloxyethyl isocyanate to hydroxyl groups in the acrylic resin, it may be a ratio of the isocyanate groups in a range from 0.1 to 5 mol, and preferably from 0.5 to 3 mol of the isocyanate groups to 1 (one) mol of hydroxyl groups. In a case of using the methacryloiloxyethyl isocyanate at an amount of more equivalent to the hydroxyl groups in the acrylic resin, molecules of the methacryloiloxyethyl isocyanate also react with carboxyl groups in the acrylic resin to form a linkage of "—CONH—CH$_2$—CH$_2$—".

In the above formula (1), Z is useful to change or modify properties of the urethane modified acrylic resins mentioned above. As a compound to be used for introducing "Z", there may be used a monomer capable of imparting releasability, a monomer having bulky structure, or a monomer having cyclic hydrophilic group.

Concrete examples of monomers capable of imparting releasability include: a monomer having aromatic ring such as phenyl group and naphthyl group or heteroaromatic ring such as pyridine; a silicone oil (resin) having polymerizable double bonds such as (meth)acryloyl modified silicone oil (resin) and vinyl modified lauryl(meth)acrylate and stearyl (meth)acrylate; a monomer having a group containing silicon atom such as γ-(meth)alkoxypropyltrimetoxysilane; a monomer having a fluorine-containing group such as 2-(perfluoro-7-methyloctyl) ethylacrylateandheptadecafluorodecyl (meth)acrylate; or the like.

Concrete examples of monomers having bulky structure include isobornyl (meth)acrylate, cyclohexyl (meth) acrylate, dicyclopentanyl (meth)acrylate, dicyclopentenyl (meth)acrylate, EO modified dicyclopentenyl (meth)acrylate or the like.

Concrete examples of monomers cyclichydrophilic group include such as acryloyl morpholine, vinyl pyrrolidone and vinyl caprolactone or the like.

The examples mentioned above represent the case that all of $R^1$ and $R^2$ are methyl group, and X and Y are ethylene group in the formula (1). The present invention however is not limited to a range of these examples. The six substituents $R^1$ may be independently hydrogen atom or methyl group. $R^2$ may be methyl group, ethyl group, n- or iso-propyl group, n-, iso-, tert-butyl group, unsubstituted or substituted phenyl group, unsubstituted or substituted benzyl group or the like. X and Y may be independently ethylene group, propylene group, diethylene group dipropylene group or the like. Average molecular weight of the urethane modified acrylic resins is preferably 10,000 to 200,000, or more preferably 20,000 to 40,000 when measuring by the gel permeation chromatography using polystyrene as standard.

To adjust flexibility and/or viscosity of the ionizing radiation-cured resin which forms the relief layer 15 after a curing process, the ionizing radiation-curable resin to be used in the present invention may incorporate with ordinary thermoplastic resins, monomers, oligomers or the like. The monomer and oligomer may be selected among various mono- or poly-functional compounds such as acrylic compounds.

Examples of the monofunctional monomers or oligomers include mono(meth)acrylate such as tetrahydrofulfuryl (meth)acrylate, hydroxyethyl (meth)acrylate, vinyl pirolidone, (meth)acryloyloxyethyl succinate, and (meth) acryloyloxyethyl phthalate. Examples of the polyfunctional monomers or oligomers are following (they are sorted by their structure): polyol (meth)acrylates such as epoxy modified polyol (meth)acrylate and lactone modified polyol (meth)acrylate; polyester (meth)acrylate; epoxy (meth) acrylate; urethane (meth)acrylate; and poly (meth)acrylate containing any one of structures selected among polybutadiene-type, isocyanuric acid-type, hydantoin-type, melamine-type, phosphoric acid-type, imide-type, and phosphazene-type structures. That is, various monomers or oligomers which are curable by ultraviolet radiation or electron beam are available.

More specially, examples of the difunctional monomers or oligomers include polyethyleneglycol di(meth)acrylate, polypropyleneglycol di(meth)acrylate, neopentylglycol di(meth)acrylate, 1,6-hexanediol di(meth)acrylate, and so on. Also, examples of the trifunctional monomers or oligomers or polymers include trimethylolpropane tri(meth) acrylate, pentaerythritol tri(meth)acrylate, aliphatic tri (meth)acrylate, and so. Also, examples of the tetrafunctional monomers or oligomers include pentaerythritol tetra(meth) acrylate, ditrimethylolpropane tetra(meth)acrylate, aliphatic tetra(meth)acrylate, and so on. Moreover, examples of the pentafunctional or more functionalized monomers or oligomers include dipentaerythritol penta(meth)acrylate, dipentaerythritol hexa(meth)acrylate, and (meth)acrylate containing any one of structures selected among polyester structure, urethane structure, phosphazene structure, or the like.

Herein, it is to be noted that a term "(meth)acrylate" or "(meth)acrylic" mean "acrylate and/or methacrylate" or "acrylic and/or methacrylic" respectively.

The number of the functional group in these monomers or oligomers is not limited. However, if these materials have less than three functional groups in one molecule, heat resistance of the relief layer is liable to lowered, and there may be caused problems that abrasions or scratches are made at a part of the relief layer 15, or a surface of the relief layer becomes cloudy. On the other hand, if these materials have more than twenty functional groups in one molecule, flexibility of the relief layer is liable to be lowered. For these reasons, the molecule having 3–20 functional groups in one molecule is preferably used.

The monomers and/or oligomers described above can be used alone or in combination. The monomers and/or oligomers may be used at an amount in a range from 5 to 90 parts by weight, and preferably from 10 to 70 parts by weight per 100 parts by weight of the urethane modified acrylic resins. When amount of the monomers and/or oligomers is lowered than the above described range, the relief layer to be made of the resultant ionizing radiation-cured resin may be insufficient in some properties such as strength, heat resistance, abrasion or scratching resistance, water resistance, solvent resistance, or adhesiveness to the substrate 11. On the other hand, when amount of the monomers and/or oligomers is raised over the above described range, the relief forming layer which is made of the ionizing radiation-curable resin and still in a pre-cured state is liable to become excessively high in tackiness of its surface, and there may be caused problems such as occurrence of blocking phenomenon, or deterioration of process-suitability for repeating duplication of the relief (namely, embossing performance) which is lead by "phenomenon of partial remaining on the plate" called by the parsons skilled in the art. That is, when a relief structure such as a relief hologram or a diffraction grating is formed on a surface of a relief forming layer made of a curable resin composition through an embossing process with a press stamper (hereinafter, simply referred as "stamper"), a part of the curable resin composition which is still in an un-cured state adheres to and remains on the cavity of the press stamper. This is the phenomenon of partial remaining on the plate.

In order to form (duplicate) a relief configuration onto the relief forming layer (the ionizing radiation-curable resin layer), a stamper which is usually made from metal or resin and has a cavity formed into three-dimensional convex and concave patterns reverse to that of a relief configuration to be duplicated is pressed onto the relief forming layer to form the relief configuration. A releasing agent may be added to the relief forming layer in order to make it easy to be peel the stamper off from the relief forming layer.

In the present invention, conventionally known releasing agents may be used. Examples of releasing agents include: solid waxs such as polyethylene wax, amide wax, and Teflon (trademark) powder; fluorine type or phosphate type surface active agents; silicones, or the like. Preferably, releasing agents are modified silicons. Specific examples of silicones are side chain type modified silicone oil, both end type modified silicone oil, one end type modified silicone oil, both side end type modified silicone oil, methylpolysiloxane containing trimethylsiloxy silic acid (called as "silicon resin"), silicone-grafted acryl resin, methylphenylsilicone oil, or the like.

For modified silicone oil, reactive silicone oils and unreactive silicone oils can be available. Examples of the reactive silicone oils include amino-modified type, epoxy-modified type, carboxyl group-modified type, carbinol-modified type, (meth)acryl-modified type, mercapto-modified type, phenol-modified type, one-end reactive type, different functional group modified type, or the like. Herein, the different functional group modified type is a reactive silicone which is obtained by reacting every molecule of the silicone with two or more modifying agents, such as agents of amino-modifying, epoxy-modifying, carboxyl-modifying, carbinol-modifying, (meth)acryl-modifying, mercapto-modifying, phenol-modifying or the like.

Examples of the unreactive silicone oils include polyether-modified type, methylstyryl-modified type, alkyl-modified type, higher fatty ester-modified type, hydrophilic-specifically modified type, higher alkoxy-modified type, higher fatty acid-modified type, fluorine-modified type, or the like.

Among these silicone oils, reactive silicone oils react with and bond to the resins at a curing process using the ionizing radiation rays, whereby making reactive silicone oils and the resins inseparable. Therefore, the reactive silicone oil does not bleed out (leak out) of a surface of the relief layer after forming the relief like convex and concave patterns. This specific property improve adhesive ability between the relief layer 15 and the reflection layer 17 formed on the surface of the relief layer 15.

An amount of the releasing agents to be used may be in the range of about 0.1 to 50 parts by weight, and preferably about 0.5 to 10 parts by weight per 100 parts by weight of the ionizing radiation-curable resin. When an amount of the releasing agent lowers under the range described above, peeling performance between the stamper and the relief forming layer may become insufficient, and thus it may be difficult to prevent the stamper from fouling. On the other hand, when an amount of the releasing agent is raised over the range described above, there may arise problems such as roughness of the coating surface caused by repellency of the composition upon coating, inhibition of adhesion of the coating to the substrate and its adjacent layer for example a reflection layer, and destruction of the relief layer 15 during transfer process (because of too low layer strength).

In order to improve the relief layer 15 which is already cured (namely, the ionizing radiation-cured resin layer) in heat resistance, layer strength, adhesiveness to the reflecting layer 17, the ionizing radiation-curable resin to be used in the present invention may be incorporated with organic metal coupling agents prior to the curing process. There may be used any organic metal coupling agents conventionally known such as silane coupling agents, titanium coupling agents, zirconium coupling agents, aluminum coupling agents or the like.

For example, as the silane coupling agents, crosslinkable silane coupling agents like silane coupling agents having vinyl group, epoxy group, mercapto group (thiol group), amino group, or hydroxyl group as its end group are available.

Examples of the silane coupling agents having vinyl end group (namely, vinyl group at end position(s)) include vinyltrimethoxysilane, vinyltriethoxysilane, and so on.

Examples of the silane coupling agents having epoxy end group include γ-glycidyloxypropyltrimethoxysilane, γ-glycidyloxypropyltriethoxysilane, γ-glycidyloxypropylmethyldimethoxysilane, methacryloxypropyltrimethoxysilane, methacryloxypropyltriethoxysilane, methacryloxypropylmethyldimethoxysilane, and so on.

Example of the silane coupling agents having mercapto (thiol) end group include γ-mercaptopropyltrimetoxysilane, mercaptopropyltriethoxysilane, β-mercaptoethylmethyldimethoxysilane, and so on.

Examples of the silane coupling agents having amino end group include γ-aminopropyltriethoxysilane, aminopropyltrimethoxysilane, γ-aminopropoxypropyltrimethoxysilane, β-aminoethyltrimethoxysilane, N-(β-aminoethyl)-γ-aminopropyltripropyltrimethoxysilane, N-(β-aminoethyl)-γ-aminopropyltripropylmetyldimethoxysilane, and so on.

Examples of the silane coupling agents having a hydroxyl end group include β-hydroxyethoxyethyltriethoxysilane, γ-hydroxypropyltrimethoxysilane, and so on.

These silane coupling agents may be used alone or in combination.

Examples of the titanium coupling agents include titanium alkoxides such as tetraisopropyltitanate and tetra-n-butyltitanate, and titanium chelates such as titanium acetylacetonate and titanium tetraacetylacetonate.

Examples of the zirconium coupling agents include zirconium alkoxides such as tetra-n-propoxyzirconium and tetra-n-butoxyzirconium, and zirconium chelates such as zirconium tetraacetylacetonate, zirconium dibutoxybis(acetylacetonate), zirconium tributoxyethylacetoacetate, zirconium butoxyacetoacetate bis(ethylacetoacetate), and so on.

Examples of the aluminum coupling agents include aluminum alcoholates such as aluminum isopropylate, mono-sec-butoxyaluminium diisopropylate, and aluminum ethylate, aluminum chelates such as ethylacetoacetatealuminum diisopropylate and aluminum tris(ethylacetoacetate), and cyclic aluminum oligomers.

These organic coupling agents may be used at an amount in a range from 0.1 to 10 parts by weight per 100 parts by weight of the ionizing radiation-curable resin.

Ionizing Radiation Ray:

The layer made of the ionizing radiation-curable resin (namely, the relief forming layer) mentioned above can be converted to the layer with a relief pattern made of the ionizing radiation-cured resin (namely, the relief layer 15) by forming a relief configuration on the relief forming layer and irradiating it with an ionizing radiation ray to cure it. Examples of the ionizing radiation rays to be applicable include ultraviolet ray (UV), visible light, γ-ray, X-ray, electron beam (EB) or the like. The ultraviolet ray (UV) is preferable among them. In a case of curing the ionizing radiation-curable resin by the ultraviolet ray, it is preferable to add a photopolymerization initiator and/or a photopolymerization promoter to the ionizing radiation-curable resin. To the contrary, in a case of curing by the electron beam which has high energy, no additive is required for curing the resin. If a proper catalyst is present in a resin composition, it can be cured by thermal energy.

Photopolymerization Initiator for Relief Layer:

As photopolymerization initiators, there may be applicable, for example, acetophenones, benzophenones, Michler-benzoylbenzoate, α-amiloxime ester, tetramethylthiuramdisulfide, thioxanthons or the like. Photosensitizers or photopolymerization promoters can be added as required. The photosensitizers and/or photopolymerization promoters conventionally known may be used in the present invention, and Examples thereof include: benzoin type compounds such as benzoin, benzoin methyl ether, benzoin ethyl ether, benzoin isopropyl ether, α-methylbenzoin and α-phenylbenzoin; anthraquinone compounds such as anthraquinone and methylanthraquinone; phenylketone compounds such as benzil, diacetyl, acetophenone and benzophenone; sulfide compounds such as diphenyldisulfide and tetramethylthiuramdisulfide; halogenated carbonhydride such as α-chloromethynaphthalene, α-chloromethyanthracene, hexachlorobutadiene and pentachlorobutadiene; n-butylamine, triethylamine, tri-n-butylphosphine, and so on.

Preferable amount of the photosensitizers and/or photopolymerization initiators is in a range from about 0.5 to 10 parts by weight per 100 parts by weight of the ionizing radiation-curable resin such as the urethane modified acrylic resin.

In addition to the additives described above, if a polymerization inhibitor is added in the ionizing radiation-curable resin composition of the present invention, a storage stability of the resin can be improved. Examples of polymerization inhibitors include phenols such as hydroquinone, t-butylhydroquinone, catechol, and hydroquinone monomethyl ether; quinones such as benzoquinone and diphenylbenzoquinone; phenothiazines; copper and copper compounds; and so on. Other kinds of materials or additives, which provide a good effect, such as promoting agents, viscosity control agents, surface active agents, defoaming agent or the like can be added as required. Also, some sort of polymers such as styrene-butadiene rubber can be added.

In a case of forming the peelable layer 13, it is preferable that a relief layer 15 is made of a cured product mainly composed of the ionizing radiation-cured resin but containing substantially no thermoplastic resin, and that a peelable layer 13 is made of a cured product composed of the ionizing radiation-cured resin and the thermoplastic resin. The thermoplastic resin is incorporated into the peelable layer in order to improve adhesion to the substrate.

In a case of not forming the peelable layer 13, it is preferable that a relief layer 15 is made of a cured product mainly composed of the ionizing radiation-cured resin but containing substantially no thermoplastic resin.

For the thermoplastic resin, polyester resins and copolymer resins containing a monomer unit derived from vinyl chloride and/or vinyl acetate (such as vinyl chloride-vinyl acetate copolymer) is preferably used. One or more thermoplastic resins may be used. Thickness of the peelable layer 13 may be in a range from about 0.1 µm to 10 µm, and preferably 0.2 µm to 5 µm.

In the case of forming the peelable layer 13, it is preferable to adjust a content ratio of the peelable layer so as to be 90 to 99.9% by weight of the ionizing radiation-curable resin and 0.1 to 10% by weight of the thermoplastic resin based on the total weight of the composition for the peelable layer 13.

When an amount of the thermoplastic resin is lowered under the range described above, adhesion to the substrate 11 is liable to be insufficient, and there may be problems that the relief layer 15 is peeled off from the substrate 11 during handling of the transfer ribbon, or burrs of the relief layer remain on a region between transferred dots after the transfer process.

On the other hand, when an amount of the thermoplastic resin is raised over the range described above, adhesion to the substrate 11 is liable to be excessively high, and there may be problems that the layers including the relief layer 15 can not be transferred in a thermal transfer process using a thermal head, or chipping of the transferred dots is caused.

A thickness of the relief layer 15 is usually from 0.1 µm to 30 µm, preferably from 0.1 µm to 10 µm, and more preferably 0.2 µm to 5 µm.

In the case of incorporating no thermoplastic resin into the peelable layer 13, the peelable layer 13 may be made of a resin composition mainly composed of the completely same ionizing radiation-cured resin as that of the relief layer 15, so that the peelable layer 13 and the relief layer 15 is formed as substantially integrated mono-layer.

The peelable layer 13 containing no thermoplastic resin may also be made of a resin composition mainly composed of a ionizing radiation-cured resin which is the substantially same as, but slightly deferent from, that of the relief layer 15.

In any cases described above, each of coating compositions for the peelable layer 13 and the relief layer 15 maybe simultaneously applied to the substrate by a single coating process, or individually applied to the substrate by separate coating processes.

When the peelable layer 13 contains no thermoplastic resin, a thickness of the relief layer 15 is usually in a range about from 0.2 µm to 30 µm, preferably about from 0.5 µm to 10 µm.

On the other hand, in a case of forming no peelable layer 13, the relief layer 15 is incorporated with no thermoplastic resin. In this case, A thickness of the relief layer 15 is usually in a range about from 0.2 µm to 30 µm, preferably about 0.5 µm to 10 µm.

Reflection Layer of Transfer Ribbon:

The reflection layer 17 formed on the relief surface, which is a surface formed into a relief configuration such as the hologram and/or the diffraction grating makes the reproduced image of the hologram and/or the diffraction grating visible clearly.

In the case that a metal capable of reflecting light is used as the reflection layer 17, the resultant relief structure becomes opaque. On the other hand, in the case that a transparent metal compound which is a transparent material and has a refractive index different from that of the relief layer 15 is used as the reflection layer 17, the resultant relief structure becomes transparent type. As material for the reflection layer 17, there may be used metals such as Cr, Ti, Fe, Co, Ni, Cu, Ag, Au, Ge, Al, Mg, Sb, Pb, Pd, Cd, Bi, Sn, Se, In, Ga, Rb or the like; metal compounds such as oxides, sulfides and nitrides of these metals; or mixture thereof. Among them, preferable metal materials are aluminum, chromium, nickel, gold and silver.

The reflection layer 17 may be a mono- or multi-layer structure, and each layer may be formed of any one of the above exemplified materials.

The transparent type reflection layer 17 can be formed with the use of a transparent metal compounds that have a refractive index different from that of the relief layer 15. The difference in optical refractive index between the transparent type reflection layer 17 and the relief layer 15 makes the relief such as a hologram visible nevertheless the transparent type reflection layer 17 has almost transparent hue and no metallic luster. The larger a difference in refractive index between the transparent type reflection layer 17 and the relief layer 15 becomes, the more excellent a refractive performance becomes. The difference in the refractive index is preferably 0.3 or more, more preferably 0.5 or more, and still more preferably 1.0 or more. Example of the materials which can be used as the transparent type reflection layer 17 include ZnS, $TiO_2$, $Al_2O_3$, $Sb_2O_3$, SiO, TiO, $SiO_2$, ITO or the lie. ITO and tin oxide is more preferable because either of their refractive indexes is about 2.0, thus providing a sufficient difference in refractive index. Also, metal compounds having a small refractive index such as LiF, $MgF_2$, $AlF_2$ or the lie can provide a sufficient difference in refractive index. Herein, the term "transparent" in the transparent type reflection layer 17 means a state exhibiting a sufficient light-transmission in at least a visible region, the state includes a colored and an uncolored transparency.

The reflection layer 17 made of the metals or the metal compounds described above may be formed so as to have a thickness of preferably about from 10 to 5000 nm, and more preferably about from 20 to 2000 nm by a vacuum thin film forming method such as a vacuum deposition method, a sputtering method, an ion-plating method or the like. When a thickness of the reflection layer is lowered under the range described above, the reflecting effect may be reduced because an excessive small thickness will cause a somewhat large transmittance of radiations. On the other hand, when a thickness of the reflection layer is raised over the range described above, it may be wasteful in cost because an excessive large thickness will not improve the reflecting effect any longer. The metal thin layer is more preferable in view point of providing a lame-like effect to the resultant image expressing medium.

Adhesive Layer of Transfer Ribbon:

For the adhesive layer 19, there may be used a thermo-sensitive type adhesive which can be melted or softened to exhibit adhesiveness by heating. Examples of thermo-sensitive type adhesives include ionomer resins, acid-modified polyolefine resins, ethylene-(meth)acrylic acid copolymer, ethylene-(meth)acrylate copolymers, polyester resins, polyamide resins, vinyl chloride resins, vinyl acetate resins, vinyl chloride-vinyl acetate resins, (meth)acrylic resins, (meth)acrylate resins, maleic resins, butyral resins, alkyd resins, polyethyleneoxide resins, phenol resins, urea resins, melamine resins, melamine-alkyd resins, cellulose resins, polyurethane resins, polyvinylether resins, silicone resins, rubber resins or the like. These resins can be used alone respectively or in combination.

The resin for the adhesive layer 19 is selected from a view point of an affinity to a transfer-receiving material. The receptive surface of transfer-receiving material is often formed of vinyl resins such as vinyl chloride resins, vinyl acetate resins, vinyl chloride-vinyl acetate copolymer resins or the like. Among these resins for the adhesive layer 19, the acryl resins, butyral resins, and polyester resins are usually preferable because of their excellent adhesive properties. A thickness of the adhesive layer 19 is usually about 0.05 to 10 $\mu$m, and preferably about 0.1 to 5 $\mu$m.

When a thickness of the adhesive layer is lowered under the range described above, adhesive strength of the adhesive layer to a transfer receiving material is liable to be weaken, and thus the adhesive layer may be peeled off from the transfer receiving material. On the other hand, when a thickness of the adhesive layer is raised over the range described above, adhesive strength will not rise no longer, so that it may be wasteful in cost and in heating energy of a thermal head.

The adhesive layer 19 may contain any additives such as filler, plasticizer, coloring agent, antistatic agent or the like as required. As fillers, extenders such as silica or calcium carbonate can be used. In particular, the addition of the fillers makes the edge of the transferred area or dots sharp. As antistatic agents, nonionic surface active agents, anionic surface active agents, cationic surface active agents, polia-mide or acrlylic acid derivatives may be used.

Heat Resistant Layer of Transfer Ribbon:

In the transfer ribbon, a heat resistant layer 21 can be formed on the substrate 11 so as to be disposed on a side opposite to that having the relief layer 15 or the peelable layer. The heat resistant layer 21 contains, as essential components, a thermoplastic resin binders which has heat resistance and a material which serves as a thermo-sensitive releasing agent or lubricant. A thermoplastic resin binders having heat resistance can be selected from a wide range, and preferable examples thereof include acrylic resins, poly-ester resins, styrene-maleic acid copolymer, polyimide resins, polyamide resins, polyamide imide resins, cellulose acetate propionate, cellulose acetate butylate, cellulose acetate, vinylidene fluoride resins, Nylon, polyvinylcarbazole, chlorinated rubbers, cyclorubbers, and polyvinylalchol.

Among these resins, a resin having a glass transition temperature of 60° C. or more is experimentally known as preferable one. Also, another preferable example experimentally known is a resin containing some extent of cross-linking structure, which may be synthesized by reacting a resin having OH group or COOH group with at least one cross-linking agent selected from compounds having two or more amino group, diisocyanate and triisocyanate.

The thermo-sensitive releasing agents or lubricants to be added in the above-mentioned thermoplastic resin include two types. That is, one of types is a group of materials which melts by heating and then be workable, and there may be exemplified waxes such as polyethylene wax, paraffin wax; amides, esters or salts of higher fatty acid; phosphates of higher alcohols or lecithin; or the like. Another one of types is a group of materials which is workable in solid state as it is, and there may be exemplified fluoro resins; powders of inorganic compounds; or the like.

In addition to these thermo-sensitive releasing agents or lubricants, other releasing agents such as powders of fluorine-containing resins, powders of guanamine resins, powders of woods or the like can be incorporated into the binder, thus providing further improved effect.

A composition that forms the heat resistant layer 21 is preferably prepared by mixing the thermoplastic resin binders and materials workable as the thermo-sensitive releasing agents or lubricants at the ratio of 10 to 100 parts by weight to 100 parts by weight of the thermoplastic resin binders. A coating process on the substrate 11 may be carried out in such manner that: first, the composition is mixed and kneaded with a suitable solvent to prepare ink (a coating liquid or a coating material); next, the ink is applied onto the surface of the substrate 11 so as to be disposed on a side opposite to that having the relief layer and adjust an applied amount within a range from about 0.1 to 4 g/m$^2$ in terms of the solid content; finally the applied layer is dried thereby obtaining a heat resistant layer. It is possible to use any known coating method Such as roll coating method, gravure coating method, screen coating method, fountain coating method or the like.

Primer Layer:

In order to secure a fixation between the substrate 11 and the heat resistant layer 21, a primer layer may be formed on the substrate 11 in advance. The primer layer is selected in consideration of a material of the substrate 11 and a sort of the thermoplastic resin used for the heat resistant layer 21. So, examples of the materials for the primer layer include acrylic resins, polyester resins, polyvinyl acetate resins, vinyl chloride-vinyl acetate copolymer, or combination of polyols/isocyanates, epoxy compounds/isocyanates, and polyols/melamines or the like. In a case of forming a primer layer, preferable thickness thereof is in a range from about 0.05 to 0.5 $\mu$m. If a primer layer is too thin, it will provide poor adhesive strength. If a primer layer is too thick, it will provide a poor sensitivity to a thermal head, a poor heat resistance, a reduction of an adhesive strength by a cohesive failure. A coating method for the primer layer may be performed by almost same way for the heat resistant layer 21 in such manner that the ink is first prepared using a proper solvent, and the ink is applied to the substrate by a suitable coating method.

The primer layer may be subjected to an antistatic treatment by incorporation of antistatic agents. Examples of the antistatic agents include: polyethylene glycol type nonionic surface active agents such as higher alcohol-ethylene oxide adducts and fatty acid-ethylene oxide adducts; polyhydric alcohol type nonionic surface active agents such as poly-ethylene oxide and fatty acid ester of glycerine; anionic surface active agents such as salts of carboxylic acids like alkali metal salts of higher fatty acid, salts of higher alcoholic sulphate; cationic surface active agents such as quaternary ammonium salts like alkyl trimethyl ammonium salts; amino acid type amphoteric surface active agents such as higher alkyl aminopropioic acid salt; betaine type amphoteric surface active agents such as higher alkyl dimethylbe-taine. Among these materials, one or more compounds can be use singly or in combination. Also, fine powders of metal oxides can be used as antistatic agents, for example, tin oxide of 5 to 50 $\mu$m in particle size.

The materials for the primer layer are mixed with suitable solvents to prepare ink and then be used in a coating process. The coating material forming the primer layer may be prepared in a form of a water-base coating liquid by using a water dispersible or a water soluble resin as a resin for primer layer. The solvent in the ink for the primer layer is removed from the primer layer on a course of the coating and drying process. However, removal of the solvent is often incomplete, thus causing a problem of so-called "remaining solvent".

This remaining solvent makes the heat resistant layer 21 or the adhesive layer 19 softened, so that the transfer ribbon 1, which usually keeps ribbon shape, become sticky to obstruct supplying or feeding of the transfer ribbon 1. To the contrary, use of water as solvent does not cause such a problem. Moreover, though a vaporized solvent which is emitted by the drying process generally causes air-pollution, such an air-pollution can be prevented insofar as water is used as the solvent.

Furthermore, a water dispersible resin is hardly re-dissolved once it is formed into a film- or layer-form, and the primer layer thus formed is hardly damaged even when forming the heat resistant layer 21 directly on the primer layer by a coating process. Therefore, the primer layer formed from the water dispersible resin can stably exhibit good performances.

As mentioned above, provision of the heat resistant layer 21 to the transfer ribbon 1 makes an applicable range of kinds of the transfer-receiving material wider. Moreover, provision thereof can prevent a heat fusion between the substrate 11 and a thermal head (namely, so-called sticking).

In particular, according to an escalation of requirement to a high speed-transferring (typing, printing) operation, when a printing process using a thermal head is carried out by heating from a surface of the heat resistant layer 21 of the transfer ribbon 1, a high energy which is needed to obtain sufficient transfer efficiency even in the high speed printing is supplied to the transfer ribbon 1 from the thermal head. In such an operation, the transfer ribbon 1 having the heat resistant layer 21 can prevent the sticking of the thermal head.

Method for Production of Transfer Ribbon:

A method for a production of the transfer ribbon 1 will be explained hereafter.

In one embodiment, the transfer ribbon 1 has a structure of substrate 11/peelable layer 13/relief layer 15/reflection layer 17/adhesive layer 19, that is, the peelable layer 13, the relief layer 15, the reflection layer 17 and the adhesive layer 19 are successively laminated on a front face of the substrate 11 in this order from bottom side close to a surface of the substrate 11 to a top side.

The transfer ribbon 1 of the above embodiment can be produced by performing the following processes in order:

(a) the process to form the peelability-potential layer on the substrate 11;

(b) the process to form the relief forming layer on the peelability-potential layer;

(c) the process to form a relief configuration (to duplicate a relief structure) onto the relief forming layer;

(d) the process to irradiate the relief forming layer and the peelablility-potential layer with ionizing radiation rays to form the relief layer 15 and the peelable layer 13; and, (e) the process to form the reflection layer 17 on a surface of the resultant relief.

It is enough for a layered structure of the transfer ribbon of the present invention that at least the relief layer 15 and the reflection layer 17 is laminated on one side of the substrate 11. The peelable layer 13 can be formed in the transfer ribbon as required, and the adhesive layer 19 can be formed on a image-receiving material. Although the peelable layer 13 and the adhesive layer 19 are not essential, they are often provided to the transfer ribbon of the present invention. Accordingly, a method for a production of the transfer ribbon will be explained by referring to a representative embodiment including the peelable layer 13 and the adhesive layer 19.

(a) Process to Form Peelable Layer 13 on Substrate 11

In case of forming the peelable layer 13 and the relief layer 15 on one surface of the substrate 11, first, the formation of the peelability-potential layer on one surface of the substrate 11 is performed. To the ionizing radiation-curable resin such as the urethane modified acrylic resins mentioned above, the above mentioned additives such as mono- or poly-functional monomers or oligomers, releasing agents, organic metal coupling agents, photopolymerization initiators or the like are added, as required. In order to secure the adhesive strength to the substrate 11, the thermoplastic resins also added to the ionizing radiation-curable resin at a ratio of 0.1 to 10% by weight based on the whole amount of the composition for the peelable layer. Then, the composition is dissolved or dispersed into a suitable solvent to prepare the ionizing radiation-curable resin composition (ink).

As the solvent, any organic solvent capable of dissolving the resin can be available. For example, aromatic type solvents such as toluene and xylene, ketone type solvents such as acetone, methyl isobutylketone and cyclohexanone, cellosolve type organic solvents such as methylcellosolve, ethylcellosolve are available. In particular, a mixed solvent made from two or more these solvents exemplified above is preferable in consideration of coating suitability or drying ability.

Herein, "the ionizing radiation-curable resin" means the precursor in a non-cured or incompletely cured state, which have not been irradiated with the ionizing radiation rays. And "the ionizing radiation-cured resin" means the cured resin after the irradiation.

The ionizing radiation-curable resin composition (ink) is applied onto the substrate 11 by any known coating or printing method and then dried, thereby forming a peelability-potential layer. As the coating method, the following examples are employable: a roll coating, reverse roll coating, transfer roll coating, gravure coating, gravure reverse coating, kiss coating, comma coating, rod coating, blade coating, bar coating, wirebar coating, knife coating, squeeze coating, air doctor coating, air knife coating, die coating, rip coating, curtain coating, flow coating, dip coating, spray coating, cast coating, impregnation coating, and soon. As printing method, the following examples are employable: relief printing, screen printing, flexographic printing, resin relief printing, gravure printing, gravure offset printing.

(b) Process to Form Relief Forming Layer on Surface of Peelability-Potential Layer To the ionizing radiation-curable resin such as the urethane modified acrylic resins mentioned above, the above mentioned additives such as mono- or poly-functional monomers or oligomers, releasing agents, organic metal coupling agents, photopolymerization initiators or the like are added, as required. Then, the composition is dissolved or dispersed into a suitable solvent to prepare a composition for the relief forming layer (ink).

The composition for the relief forming layer (ink) is applied onto the peelability-potential layer by any known coating or printing method and then dried, thereby forming the relief forming layer. The same coating or printing methods as used for the peelability-potential layer can be applicable to the formation of the relief forming layer. If the urethane modified acrylic resins mentioned above is used as the ionizing radiation-curable resin, a surface of the relief forming layer does not show tackiness even before being cured, and therefore, so that the resultant film can be directly rolled up, and therefore the film is convenient in processing.

(c) Process to Form Relief Configuration on Relief Forming Layer

As described above, a surface of the relief forming layer is formed into a relief configuration. The relief is a convex-concave surface pattern (light diffraction pattern) reproducible a two-dimensional or three-dimensional image. For this convex-concave surface pattern, a hologram or a diffraction grating is available. In the hologram or the diffraction grating, a distribution of a light intensity given by an interference fringe which is generated from interference between an objective light and reference light has been recorded by a convex-concave pattern.

Examples of the holograms include: laser reproducing hologram such as Fresnel's hologram, Fraunhofer hologram, lens-less Fourier transformation hologram, and image hologram; white light reproducing hologram such as rainbow hologram; other holograms which use the theory of these holograms such as color hologram, computer hologram, hologram display, multiplex hologram, holographic stereogram, holographic diffraction grating, and so on.

For the diffraction grating, a holographic diffraction grating which uses a method of hologram recording is available. Another example of the diffraction grating is a diffraction grating which is mechanically made by any device such as an electron beam lithographic device, in which any diffracted lights in accordance with a predetermined design can be obtained based on a calculation. These holograms and/or diffraction gratings can be recorded alone or in multiply-recorded state, or in combined state.

Stamper of Relief:

A stamper may be a metal plate or a resin plate, and a cavity (nemaly, an inner surface) thereof has a surface configuration reverse to a relief to be finally obtained. In one typical procedure, the stamper is pressed (embossed) on the surface of the relief forming layer to form a relief configuration, and then the stamper is peeled off. In this way, the duplication is done.

A master stamper may be directly used for the duplication. But there is a possibility to be abraded or damaged. For this reason, a metal or resin duplicated stamper is produced and used for duplication in a commercial phase or a mass-productive phase. The metal or resin duplicated stamper can be produced similarly to that of analog audio record or the like, in such manner that the master is plated and the resultant deposited product is peeled off, and the thus peeled product is used as a stamper, or that the master is coated with an ultraviolet radiation-curable resin, and then irradiated with the ultraviolet radiation rays to cure the resin, and the resultant cured resin is peeled off (manufactures call this method "2P method") and the thus peeled product is used as a stamper.

In the mass-productive duplication, the relief is duplicated on the surface of the relief forming layer by an embossing process using the metal or resin stamper, then the resultant layer is peeled off, and after peeling, the resultant layer is irradiated with the ionizing radiation to be cured. In the other procedure, the relief duplicated layer is irradiated with the ionizing radiation during the embossing process, and then the resultant cured layer is peeled off. Moreover, an employment of a long tape-like shaped ribbon makes it possible to perform this mass-productive duplication continuously. In the present invention, as mentioned above, the addition of the releasing agents to the relief forming layer makes, for example, even in the embossing process of a diffraction grating, the stamper not become dirty. Also, such an addition improves the peelability of the stamper from the relief forming layer so that the stamper can be used continuously for long time, that is the suitability for repeat of embossing process is improved.

(d) Process to Irradiate Relief Forming Layer and Peelability-Potential Layer with Ionizing Radiation Ray During and/or after conducting of the embossing process by the stamper, a surface of the relief forming layer is irradiation with the ionizing radiation rays to cure the ionizing radiation-curable resin in the relief forming layer. If the peelability-potential layer is present under the forming layer, it is also cured together with the relief forming layer. Though the ionizing radiation rays may be classified by quantum theoretical energy levels thereof, the ionizing radiation rays to be used in the present invention means include at least all the ultraviolet radiations (UV-A, UV-B, UV-C), visible lights, γ-rays, X-rays and electron beams. Among them, ultraviolet rays (UV) are preferable.

Wavelength of Ultraviolet Rays

Figure 4A:
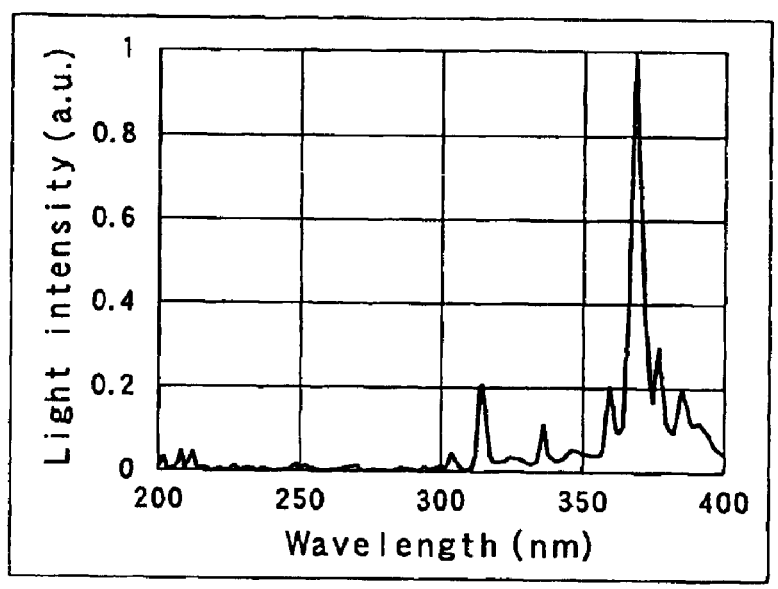
FIG. 4 is an emission profile of a high-pressure mercury lamp to be used in the present invention with or without a wavelength-selectable filter (Pyrex (trademark) glass).
Figure 4B:
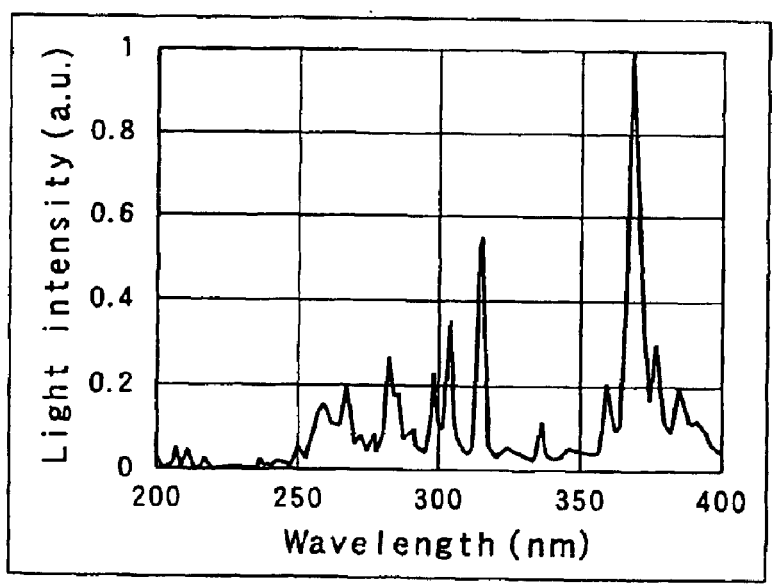

FIG. 4 shows an emission profile of a high-pressure mercury lamp to be used in the present invention with or without a wavelength-selectable filter. FIG. 4A shows a case of using Pyrex (trademark) glass as the filter, and FIG. 4B shows a case of using no filter.

For the ultraviolet lamp (the UV lamp), a high-pressure mercury lamp or a metal-halide lamp may be used, a wavelength thereof can be selected in accordance with natures of the ionizing radiation-curable resin composition.

The irradiation dose of the ultraviolet ray may be determined in consideration of natures or an amount of the ionizing radiation-curable resin, output of the UV lamp, processing speed or the like. It is preferable to exclude wavelength in a region of 300 nm or less, from the ultraviolet ray. That is to say, it is preferable that the ultraviolet ray to be used does not have wavelength in a region of 300 nm or less. Herein, the passage "to exclude wavelength in a region of 300 nm or less" means that an intensity of wavelength of 300 nm or less is 1% or less of an intensity of wavelength in a range from 300 nm to 400 nm, and thus a region of 300 nm or less does not substantially contribute to the curing reaction.

The reason to preferably exclude wavelength in a region of 300 nm or less is as follows. That is, when a ray containing 300 nm or less of wavelength, particularly 254 nm of wavelength is used for irradiation, a good peelability between the substrate 11 and the peelable layer 13 can not be gained, probably because of an excessive crosslinking reaction. To the contrary, when a wavelength-selectable filter which can cut more than 99% of the intensity of wavelength of 300 nm or less in comparison with the intensity of wavelength in a range from 300 nm to 400 nm is mounted on the high-pressure mercury lamp, a suitable adhesiveness between the substrate 11 and the peelable layer 13 can be obtained, as shown in FIG. 4A.

FIG. 4B shows the relation between wavelength and its intensities in the case where no filter is mounted on the high-pressure mercury lamp. An ultraviolet ray having the emission profile as shown in FIG. 4B contains 300 nm or less of wavelength, particularly 254 nm of wavelength; and a suitable peelability between the substrate 11 and the peelable layer 13 can be obtained if such a ray is used for irradiation.

For the wavelength-selectable filter, any materials can be used provided that it transmits the ray with 300 to 400 nm wavelength but do not substantially transmit a ray with 300 nm or less wavelength. Pyrex (trademark) glass is preferable for the filter because of its excellent mechanical strength and heat resistance.

The transfer ribbon of the present invention, such as the transfer ribbon 1 prepared as mentioned above, does not cause peeling off or exfoliation of the relief layer 15 at any phase antecedent to the thermal transfer process. In addition, when the transfer ribbon of the present invention is subjected to the thermal transfer process by means of a thermal printer having a thermal head, the transfer ribbon can precisely transfer dots having minute areas and/or dots being present close to each other at high printing speed and low thermal energy, while not causing lacks or chipping of the dots and burrs surrounding the dots.

(e) Process to Form Reflection Layer on Relief Surface

The reflection layer 17 can be formed by any one of vacuum thin layer forming methods conventionally known, example of which include vacuum vapor deposition method, sputtering method, and ion-plating method or the like.

In addition, an adhesive layer 19 may be formed on the reflection layer 17. The adhesive layer can be formed in such manner that: the thermal sensitive adhesive resin described above is dissolved or dispersed in a solvent to prepare a composition for the adhesive layer (ink); the ink thus prepared is applied onto the reflection layer by any known coating or printing method; and then the resultant coated layer is dried. For the coating method or the printing method, the same method as that used to form the peelability-potential layer is applicable. In order to improve transferability of the relief layer, fillers may be added in the adhesive layer, or a blushing treatment may be applied to the adhesive layer.

(a) Process to Form Relief Layer Directly on Substrate

The transfer ribbon of the present invention may have no peelable layer, and in such a case, the relief layer 15 is formed directly on the substrate 11. In a formation of the transfer ribbon having no peelable layer, a process (a) in which a relief forming layer is formed directly in the substrate is carried out. The formation of the transfer ribbon having no peelable layer can be conducted similarly to a formation of the transfer ribbon having the peelable layer except that a peelable layer is not formed. More specifically, the relief forming layer can be formed similarly to the case of forming the transfer ribbon having the peelable layer except that the composition for the relief layer is applied directly to the substrate. Processes following the process (a) to form the relief forming layer directly on the substrate is also the same as those of the transfer ribbon having the peelable layer.

Next, the image expressing medium according to the present invention will be explained in detail with reference to the drawings.

Figure 5:
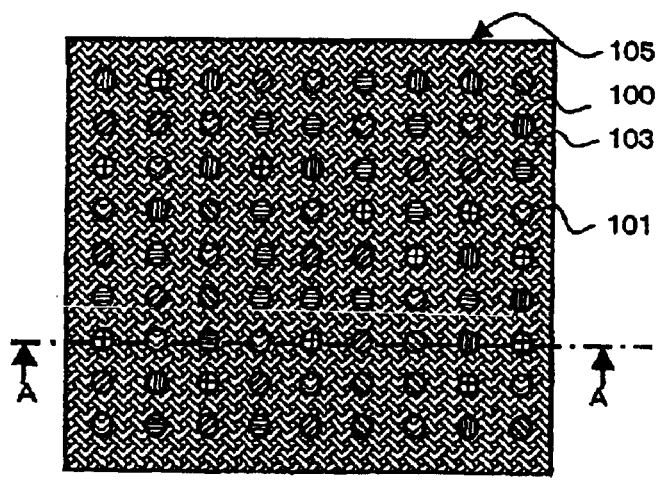
FIG. 5 is a schematic plain view showing an example of an image expressing medium of the present invention.
Figure 6:
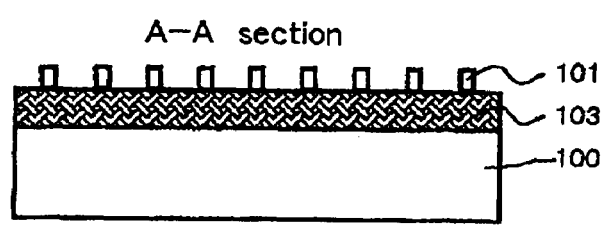
FIG. 6 is a schematic sectional view showing an example of an image expressing medium of the present invention.
Figure 7:
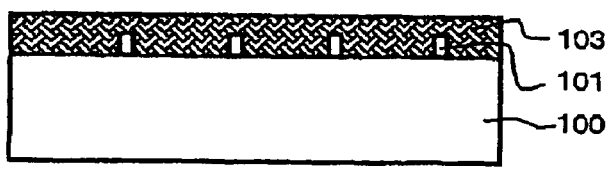
FIG. 7 is a schematic sectional view showing an example of an image expressing medium of the present invention.
Figure 8:
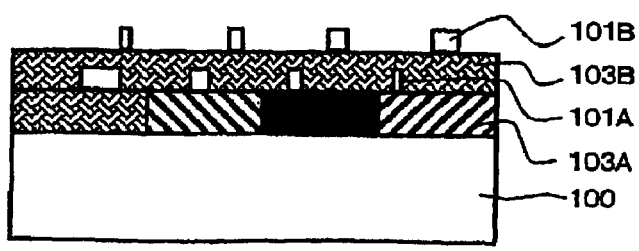
FIG. 8 is a schematic sectional view showing an example of an image expressing medium of the present invention.

FIG. 5 is a schematic plain view showing an example of an image expressing medium of the present invention. FIG. 6 is a schematic sectional view showing the image expressing medium shown in FIG. 5. FIG. 7 and FIG. 8 are the other examples of an image expressing medium of the present invention respectively.

Entire Structure of Image Expressing Medium:

FIGS. 5 and 6 shows an example of an image expressing medium 105 of the present invention. FIG. 5 is a schematic plain view and FIG. 6 is a sectional view along the A—A line indicated in FIG. 5. The image expressing medium 105 has a structure in which a color layer 103 is laminated on one surface of a substrate 100, and a number of dots 101 are formed on the color layer 103. The color layer 103 and the dots 101 can be formed on at least one surface of the medium, and it may be formed on the both surfaces.

In a case of existing the color layer 103, a positional relationship between the dots and the color layers is quite free in so far as the dots and the color layers are arranged within a same area defined on the surface of the support of the image expressing medium in a condition of allowing the dots to be visible. That is: the dots may be placed above or below the color layer; the dots and the color layers may be appositionally arranged on the same level such that they are formed directly on the substrate; or the dots and the color layers may be alternately deposited on the substrate so as to form a layered structure.

For example, in FIGS. 5 and 6, the dots 101 are placed on the color layer 103. In FIG. 7, the dots 101 are placed beneath the color layer 103. Moreover, as shown in FIG. 8, it is also allowable that dots 101A are deposited on the color layer 103A, next, another color layer 103B is deposited to cover the resultant surface of the former color layer 103A and the dots 101A, and then, other dots 101B are deposited on the color layer 103B. In this case of FIG. 8, a part of the color layer 103B may be transparent so as to make the downside dots 101A visible from the outside.

As to a color of the color layer 103, any color is permitted, for example, A single color over the whole of the color layer 103, Plural colors including gradations varying in their color and/or density in accordance with positions, plain white, transparency, semi-transparency, combinations thereof or the like.

In the present invention, it is to be noted that the color layer 103 may be a surface of the support itself. For example, the substrate 100s shown in FIGS. 6–8 may be partly or entirely colored in one or more colors, and colored portions of the substrate service as the color layer 103, and such a colored portion may include a white, transparent or semi-transparent portion.

Moreover, each of the color layers 103 itself may be an image such as a letter, mark, photograph, picture, illustration and pattern or their combination. Particularly, when a certain positional relationship is set Between the dots and the image like a letter, mark, photograph, picture, illustration or pattern, the design of the image expressing medium can be improved, thus being preferable. The color layer 103A shown in FIG. 8 exemplifies a color layer composed of different images including different colors, letters, marks, photograph, pictures, illustrations and patterns.

The support 100 is not restricted to a specific material in so far as it has a surface a part of which can be subjected to printing or transferring process and a thickness which can keep a certain flat state, and thus it may be selected from various materials in accordance with a destination of the image expressing medium.

Examples of materials for the support, particularly the substrate 100, include: papers such as high-quality paper, coated paper, paperboard, corrugated board or the like; synthetic paper; polyester resins such as polyethylene terephthalate; polyamide resins such as Nylon 6; polyolefin resins such as polyethylene; vinyl resins such as polyvinyl chloride; acrylic resins such as polymethacrylate; polycarbonate; styrene resins such as polystyrene; cellulose films such as cellophane or the like. The substrate 100 is desired to have smooth and flat surface, and it is preferable that the surface has Beck smoothness of 1000 seconds or more.

Substrate:

Prior to the formation of the color layer 103, the support such as the substrate 100 may be subjected to one or more pre-treatments to facilitate improving of adhesiveness such as corona discharge treatment, plasma treatment, ozone treatment, flame treatment, primer coating treatment (The "primer" is also called as anchor coat, adhesiveness-promoting agent, adhesiveness-facilitating agent.), preheat treatment, dust-removing treatment. The support may contain some additives, as required, such as fillers, plasticizers, coloring agents, antistatic agents or the like.

Color Layer:

The color layer 103 can be formed by printing or coating an ink, coating material, or coating solution by ordinary printing or coating methods, and then dried as required. Examples of the coating methods include roll coating, reverse roll coating, transfer roll coating, gravure coating, gravure reverse coating, kiss coating, comma coating, rod coating, blade coating, bar coating, wire bar coating, knife coating, squeeze coating, air knife coating, air knife coating, die coating, rip coating, curtain coating, flow coating, dip coating, spray coating, cast coating, impregnating coating or the like.

As printing methods, there may be exemplified planographic printing, gravure printing, relief printing, and screen printing. Some developed methods of the above mentioned basic methods may be also applicable, and examples thereof maybe include: flexographic printing, resin relief printing, gravure offset printing, and TAKO printing or the like; ink jet printing; transfer printing by use of a transfer ribbon; transfer printing by use of heat melting or sublimating ink ribbon; electrostatic printing, or the like. As other methods referred from a different technical view point, there may be exemplified: ultraviolet radiation fixing printing in which an ink is fixed by the ultraviolet radiation; baking printing in which an ink is fixed at high temperatures; non-water offset printing in which water is not used or the like.

A printing ink to be used a planographic printing, gravure printing, relief printing, screen printing or ink jet printing, contains, at least, vehicles and coloring agents and preferably has a viscosity of 0.1–3000 poise. For the coloring agents, one or more pigments are usually used by selecting from inorganic pigments and organic pigments. However, a protection ink (also called as coloring agents may be also used.

As the vehicle, there may be used one or more materials selected from among dry oils, synthetic resins, natural resins, fibrous materials rubber derivatives or the like. Examples of dry oils include linseed oil, china wood oil, perilla oil, soybean oil, fish oil, dehydrated castor oil, styrenated oil, vinyl toluenated oil, maleic oil or the like. Examples of the natural resins include wood rosin, polymerizedrosin, lime-curedrosin, zinc-curedrosin, rosin ester, shellac or the like. Examples of the synthetic resins include phenol resin, modified alkyd resin, polyamide resin, coal tar pitch, stearinpitch or the like. Examples of the fibrous materials include nitrocellulose, ethylcellulose, cellulose acetate, cellulose acetate propionate or the like. Examples of the rubber derivatives include cyclorubber, chlorinated rubber or the like.

The ink composition may contain, as required, additives such as filler, plasticizer, dispersing agent, lubricant, antistatic agent, antioxidant, fungicide agent or the like.

The ink composition can be prepared by mixing the materials described above, and then kneading or dispersing the same, and further adjusting a total solid content and/or viscosity if necessary. The ink composition thus prepared can be used for printing of the color layer through the methods described above, and an ink layer is dried and ten further subjected, if necessary, to an aging process at a temperature of 30 to 70° C. and/or irradiation with ionizing radiation rays such as ultraviolet ray or electron beam, thereby forming the color layer.

Printer:

As a printer to transfer (or print with) the dots 101 on a surface of the support such as the substrate 100 with the use of the transfer ribbon 1, a thermal printer (also called as a thermal transfer printer) maybe used. The thermal printer includes several types, for example, a type of using a thermal transfer recording medium (called as an ink ribbon) provided with a heat sublimation dye ink layer or a heat meltable ink layer.

In the thermal printer, a thermally sensitive printing head (also called as a thermal head, or a printer head) and a platen roller are installed so as to face each other. Between the thermal head and the platen roller, the ink ribbon having an ink layer such as the heat sublimation dye ink layer or the heat meltable ink layer and a support such as the substrate 100 which may have a receptor layer on its receptive surface as required are fed in a state that the ink layer of the ink ribbon and the receptive surface of the support are facing each other, and then pressed down on a face of the thermal head by the platen roller while being carried by rotation of the platen roller.

Thermal Head:

Then, heating elements in the thermal head generate heat corresponding to an image to be formed, so that the sublimation dye or heat meltable ink in the ink layer of the ink ribbon is transferred in a dot-like form from selectively heated regions of the ink layer to the support, thus printing (recording) a desired image through a thermal transfer process.

The thermal printing method includes a serial mode and a line mode. In the serial method, the printing process proceeds line by line while the thermal head is scanned in a perpendicular direction to the carrying direction of the support.

The line method employs a line type thermal head having a number of heat elements which are aligned in rows perpendicular to the carrying direction of the support. The line type thermal head is fixed along the carrying direction of the support, and only the predetermined heat elements is made to generate heat while the printing action is made to proceed (that is, the ink ribbon and the transfer-receiving material are moving), so that an image is printed over a full-width range at once.

Examples of heat element assemblies include laser heat mode thermal head, photothermal recording head or the like. In the laser heat mode thermal head system, a laser beam corresponding to signals of a image is irradiated from the laser source to the ink ribbon through its transparent support. Then the ink ribbon that has absorbed the laser is heated, so that the dye or ink of the ink ribbon is transferred to a support of the image expressing medium. In this way, the image is printed.

The photothermal recording head is essentially composed of: a photo-conductively heat generating layer which may have a two-layered structure comprising a photoconductive layer and a heat generating layer or a mono-layered structure, and which is capable of becoming conductive and generating heat when irradiated with lights and have a structure; and a pair of electrode layers which is placed so as to hold the photo-conductively heat generating layer between them, and to which a predetermined voltage will be applied. In a system using a photothermal recording head, a laser beam corresponding to signals of a image is irradiated from the laser source to the photo-conductively heat generating layer, so that a heat-generating reaction (temperature-rising reaction) is caused at an irradiated region of the photoconductive layer in the photo-conductively heat generating layer if it has the two-layered structure or the photo-conductively heat generating layer itself if it has the mono-layered structure. AS a result, the ink (dye or heat melting ink) of ink ribbon is selectively transferred to finish printing of the image.

One of the most usual thermal head makes the heat elements generate heat in a dot-like form according to signals of an image to be formed so that the ink (dye or heat meltable ink) of the ink ribbon is transferred to the support, thus printing the image. For the present invention, any thermal heads can be used. A resolution of the thermal head is preferably 100 dpi or more, more preferably 300 dpi or more, more preferably 600 dpi or more. At the time of a thermal printing, if printing energies are loaded on the thermal head by a gradational mode within 1–100% range, it makes it possible to transfer dots having areas smaller than that of a dot unit (an area unit) of the heating elements. For example, an area per one dot of 600 dpi thermal printer is 0.0016 mm$^2$, but a reduced loading energy makes it possible to transfer fine dots with an area of 0.0001 mm$^2$, which is smaller than one dot of the thermal printer. A sort of a thermal head and/or an amount of applied energy should be optimized in consideration of the dot area to be transferred.

Hitherto, many attempts have been made to produce a medium printed with fine dots through a transfer process using a thermal head and a transfer ribbon having a relief layer of a relief hologram and/or a diffraction grating. However, no practical application has been accomplished because of poor transferability. To the contrary, the image expressing medium of the present invention is practically applicable, because it can be produced by stably transferring fine dots which have never been realized from the transfer ribbon onto a support of the image expressing medium by means of a thermal head.

Transferring of Dots:

Next, a disposition of the dots 101 on the image expressing medium 105 will be explained.

Figure 9:
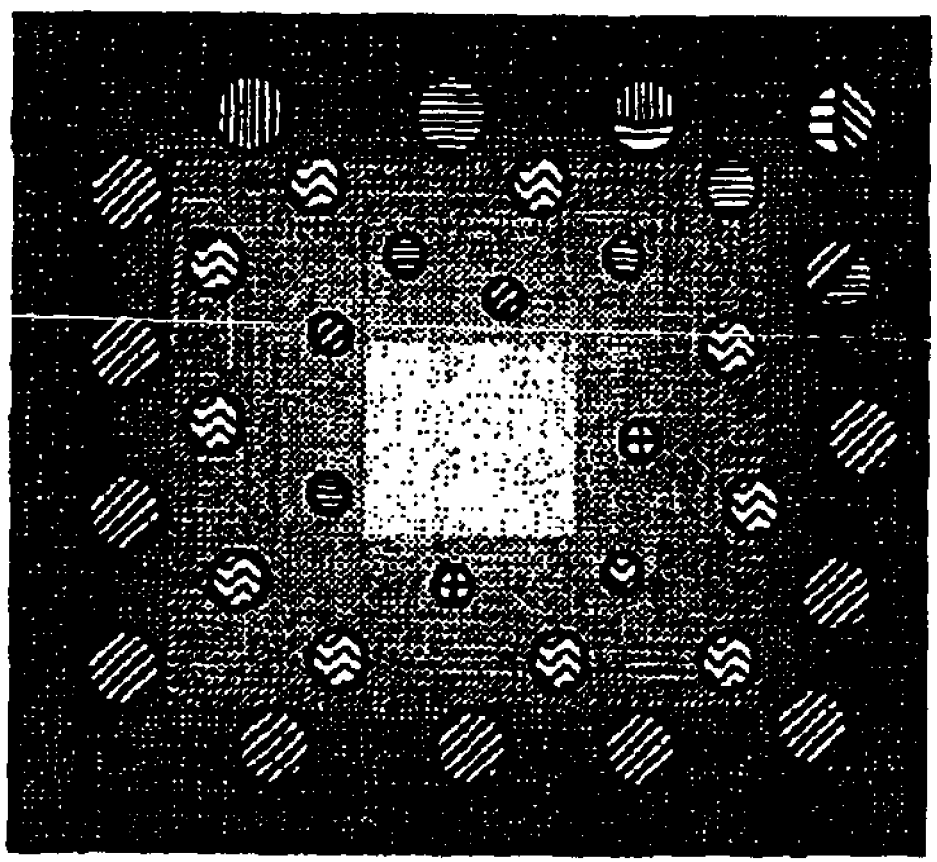
FIG. 9 is an example of an image expressing medium of the present invention, in which dots having different area are present in combination, and the dots are arranged to make a gradient of dot density.

FIG. 9 shows an example of an image expressing medium of the present invention, in which dots having different area are present in combination, and the dots are arranged to make a gradient of dot density.

Figure 10:
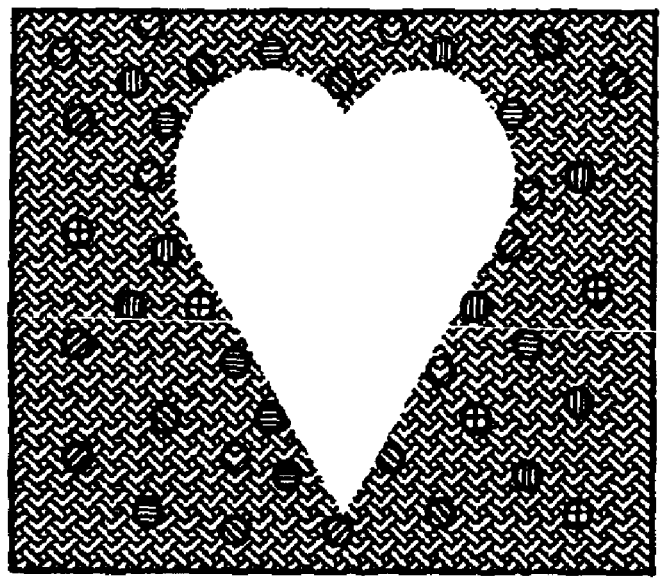
FIG. 10 is an example of an image expressing medium of the present invention, in which an arrangement of dots has an emphasizing relation with an image.

FIG. 10 shows another example of an image expressing medium of the present invention, in which an arrangement of dots has an emphasizing relation with an image.

Figure 11:
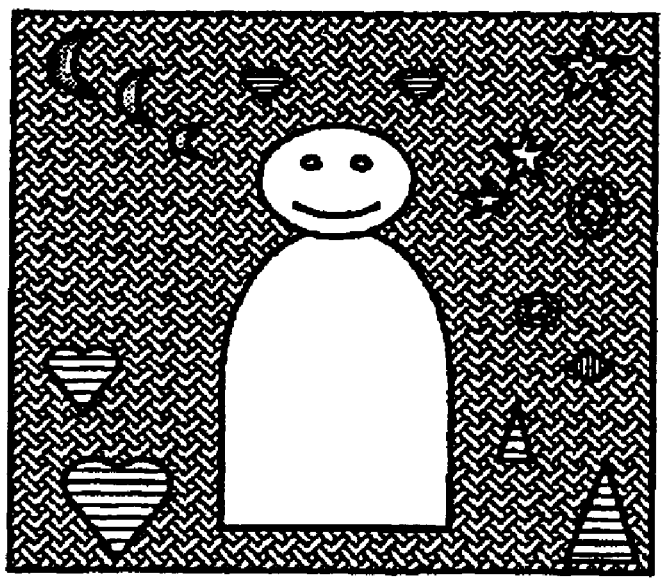
FIG. 11 is an example of an image expressing medium of the present invention, which has a figure formed by combinations of dots; and, FIG. 12 is a set of examples of image expressing mediums of the present invention, each of which has a figure formed by dots or combinations of dots.
Figure 12A:
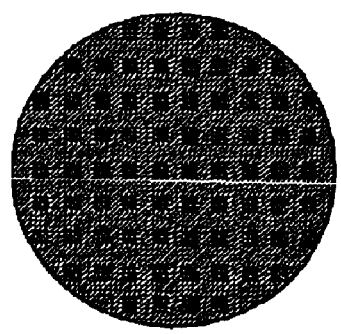
Figure 12B:
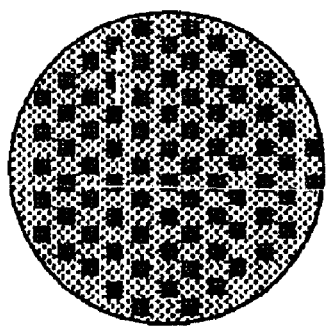
Figure 12C:
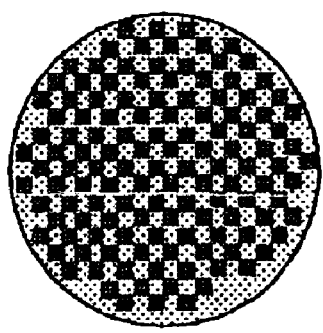
Figure 12D:
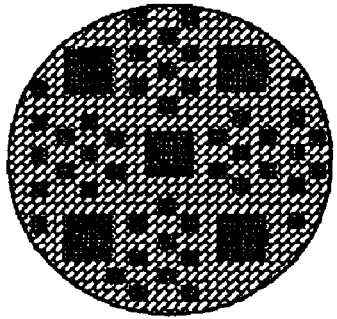
Figure 12E:
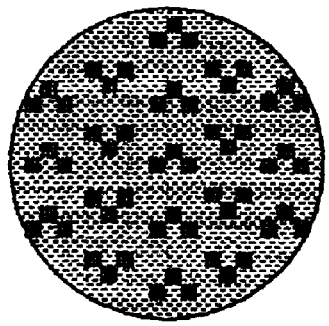
Figure 12F:
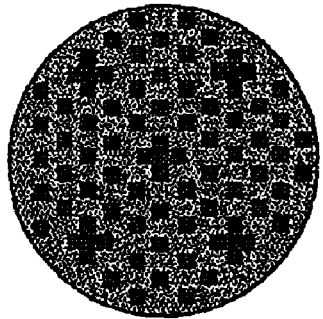

FIG. 11 shows still another example of an image expressing medium of the present invention, which has a figure formed by combinations of dots.

FIG. 12 shows still another examples of the image expressing mediums of the present invention, each of which has a figure formed by dots or combinations of dots.

The image expressing medium 105 of the present invention has an image which is expressed by the dots 101 of relief holograms and/or diffraction gratings in association with color layers 103. Such an image expressing medium 105 can be produced by transferring plural dots 101 of a relief layer onto a support 100 provided with at least the color layers 103 so as to arrange the dots and the color layers within an overlapped region with the use of the transfer ribbon 1 which has a relief layer of a relief hologram and/or a diffraction grating by means of a thermal head. The image expressing medium 105 of the present invention may be also produced by transferring the plural dots 101 of the relief layer from the transfer ribbon 1 onto a support 100 having no color layers, and then forming the color layers 103 with in a region overlapping the dots 101 by a suitable process such as a thermal transfer process or a coating process.

In the present invention, areas of the dots 101 is controlled within a range from 0.0001 to 0.09 mm$^2$, and a diffraction direction of the each dot is controlled so as to be different from that of at least one adjacent dot.

The image expressing medium 105 of the present invention essentially has dots having areas within 0.0001 to 0.09 mm$^2$, but another dots with areas out of the above described range may be added in so far as advantageous effects or benefits of the present invention can be obtained.

When areas of the dots are smaller than the range described above, a diffraction effect of the dots do not appear. On the other hand, when areas of the dots are larger than the range described above, a synergistic effect of the dots is reduced and thus a lame effect is lowered.

Sizes of the dots within the above described range correspond to sizes of the heat elements of the conventionally known thermal heads, and a thermal head to be used may be selected in accordance with a kind of an image expressing medium 105. For example, a dot size with an area of 0.0016 mm$^2$ is almost equal with the area per one dot of the 600 dpi thermal head which is used for a printer requiring relatively high resolution, like a card printer, and a dot size with an area of 0.09 mm$^2$ is almost equal with the area per one dot of the 100 dpi thermal head which is used for a printer treating large mediums, like a poster printer.

At the time of a thermal printing, if printing energies are loaded on the thermal head by a gradational mode within 1–100% range, it makes it possible to transfer dots having areas smaller than that per one dot of the heating elements. For example, an area per one dot of 600 dpi thermal printer is 0.0016 mm$^2$, but a reduced loading energy makes it possible to transfer fine dots with an area of 0.0001 mm$^2$, which is smaller than one dot of the thermal printer.

Hitherto, it has never been possible to stably transfer such fine dots without any lacks nor chipping of the dots by the thermal head.

An image expressing medium 105 shown in FIG. 5 is designed so as that dots 101 with an equal area are transferred at regular interval on a fabric-like background pattern formed by a color layer 103. The relief in the dot 101 forms diffraction gratings, and the each dot has a different diffraction direction from those of adjacent dots. Vertical lines, transverse lines, right upward-sloping lines, or right downward-sloping lines on dots in FIG. 5 indicate corrugations of relief. By these corrugations, an irradiating light is diffracted at a 90-degree angle against the corrugations.

In an image expressing medium 105 of FIG. 5, wavy lines on dots indicate corrugations of a hologram. These corrugations diffract an irradiating light and reproduce a three-dimensional image. Areas of the every dots and every combined-dot formed by connecting plural dots is within a range of 0.01–1.0 mm$^2$, and a total percentage of areas covered with the dots is usually 5 to 40%, preferably 10 to 30%. Under these conditions, the dots of the relief and the color layers forming images or pattern synergistically affect on the image expressing medium 105, whereby exhibiting a remarkably excellent lame-like effect. Surprisingly, the resultant image expressing medium 105 exhibits a superior effect of design than a real lame-effect of a fabric into which gold and silver strings are woven. It is preferable that both the area of the each dot and the percentage of the total area covered with the dots are within the ranges described above. When either of them is lower than the range described above, the visibility is lowered to reduce the advantageous effect of the dots. On the other hand. When either of them is over the range described above, the glitter-feeling of the dots becomes excessively high, so that the synergistic effect of the dots with the color layer is reduced.

An image expressing medium 105 shown in FIG. 9 is designed so as that: the dots having different area are present in combination; a density of the arranged dots has a gradient; some dots in the medium 105 are composed of plural sections respectively, and every section contained in one dot has a diffraction direction different expressing medium that has plural dots with different areas and/or different diffraction directions and/or plural sections having different diffraction directions and/or a gradient in a dot density exhibit special decoration effects.

The transfer ribbon 1 containing plural kinds of relief different in diffraction direction may be produced by use of a stamper which has the relief with two or more portions different in diffraction direction. The portions having different diffraction directions maybe a case that each of dots has a diffraction direction different from those of adjacent dots or a case that each of plural sections present in one dot has a diffraction direction different from those of adjacent sections. The relief with two or more portions different in diffraction direction can be easily obtained by multiple projection with an ordinary laser beam or an electron beam scanning to form a number of regions with partially different diffraction direction.

Dots having different diffraction directions from each other can be simultaneously formed on a support of the image expressing medium by a single action of thermal transfer using the transfer ribbon containing plural kinds of relief different in diffraction direction. Alternatively, dots having different diffraction directions from each other may be formed by a thermal transfer process using plural kinds of transfer ribbons, each of which has relief different in diffraction direction.

An image expressing medium shown in FIG. 10 is designed so as that transferred dots of the relief are harmonized with any pattern, pictures. More specifically, in the image expressing medium of FIG. 10. The plural dots are arranged to form a frame expressing a heart mark, and the color layers are arranged to form a fabric-like background pattern containing a white blank with a heart mark, and the heart-like frame formed by the dots and the heart-like blank in the background pattern are positioned in accordance with each other, so that an arrangement of the dots is matched with the whole pattern of the color layers, whereby exhibiting a high-quality design.

In the present invention, each dot in the image expressing medium can take any kinds of shapes, such as rectangle and circle. The dot can also take a form of combined-dot which is formed by connecting plural dots, and the combined-dot can be formed in any shape with any size, for example, such as heart shape, lozenge shape, star shape, crescent shape, circle shape or the like.

An image expressing medium shown in FIG. 11 is designed so as that dots having various shapes and sizes are properly arranged in combined, and the dots include some series of the same shape varying in size, for example, a series of star shape, crescent shape, heart shape triangle shape or the like.

FIG. 12 shows examples of dot and combined-dot. As shown in FIGS. 12-A to 12-F, each dot and each combined-dot can take any kinds of shapes and any size.

EXAMPLES

Hereinafter, the present invention will be explained more in detail, with reference to preparation examples of ionizing radiation-curable resin, experimental examples of the transfer ribbons, those of the image expressing medium and their comparative examples.

In the description, all designations of "parts" and "%" indicate parts by weight and weight percentage (wt. %), respectively, unless otherwise noted.

First, the examples of preparing urethane modified acrylic resins (ionizing radiation-curable resin) which were used in the present invention are described.

Preparation Example of Ionizing Radiation-Curable Resin A

Into a 2 liter four-necked flask equipped with a cooling condenser, a dropping funnel and a thermometer, 40 g of toluene, 40 g of methylethylketone (MEK), and an azo-type initiator were put. Next, a mixed solution consisting of 24.6 g of 2-hydroxyethylmethacrylate (HEMA), 73.7 g of methylmethacrylate (MMA), 24.6 g of dicyclopentenyloxyethylmethacrylate, 20 g of toluene, and 20 g of MEK was dropped from the dropping funnel into the flask for about 2 hours at a temperature in a range of 100–110° C., and then the reaction was continued for eight hours at the same temperature range. Thereafter, the reaction mixture was cooled to a room temperature.

To this flask, a mixture consisting of 27.8 g of 2-isocyanate ethylmethacrylate (SHOWA DENKO K.K., trademark: Karenz MOI), 20 g of toluene, and 20 g of MEK were added. Then dibutyltin laurylate was added to the flask as catalyst to proceed additional reactions. After confirmation of a disappearance of the 2200 cm$^{-1}$ absorbent peak, which is assigned to the isocyanate group, of the reaction product by IR analysis, the reaction was stopped.

The resultant reaction mixture of this urethane modified acrylate resins contained non-volatile matter of 41% by weight. The molecular weight (weight-average molecular weight) of the resin contained therein was 30,000, in terms of values measured by gel permeation chromatography (GPC) using THF as solvent and standardized by standard polystyrene. This polymer had 13.0 mol % of an average amount of double bond per one molecule.

The resin obtained above had a structure of the formula (1) wherein "Z" is a moiety of dicyclopentenyloxyethylmethacrylate, "$R^1$" and "$R^2$" are —$CH_3$ respectively, and "X" and "Y" are —$C_2H_4$— respectively, and "n" is 0. This resin will be hereinafter called as "ionizing radiation-curable resin A".

Preparation Example of Ionizing Radiation-Curable Resin B

Into a 2 liter four-necked flask equipped with a cooling condenser, a dropping funnel and a thermometer, 40 g of toluene, 40 g of methylethylketone (MEK), and an azo-type initiator were put. Next, a mixed solution consisting of 20.8 g of 2-hydroxyethylmethacrylate (HEMA), 39.0 g of methylmethacrylate (MMA), 45.0 g of isobornyl methacrylate, 20 g of toluene, and 20 g of MEK was dropped from the dropping funnel into the flask for about 2 hours at a temperature in a range of 100–110° C., and then the reaction was continued for eight hours at the same temperature range. Thereafter, the reaction mixture was cooled to a room temperature.

To this flask, a mixture consisting of 23.4 g of 2-isocyanate ethylmethacrylate (Show a Denko K.K., trademark: Carenz MOI), 20 g of toluene, and 20 g of MEK were added. Then dibutyltin laurylate was added to the flask as catalyst to proceed additional reactions. After confirmation of a disappearance of the 2200 cm$^{-1}$ absorbent peak, which is assigned to the isocyanate group, of the reaction product by IR analysis, the reaction was stopped. The resultant reaction mixture of this urethane modified acrylate resins contained non-volatile matter of 38.2% by weight. The molecular weight of the resin contained therein was 30,000, in terms of values measured by GPC using THF as solvent and standardized by standard polystyrene. This polymer had 12.5 mol % of an average amount of double bond per one molecule.

The resin obtained above had a structure of the formula (1) wherein "Z" is a moiety of isobornyl methacrylate, "$R^1$" and "$R^2$" are —$CH_3$ respectively, and "X" and "Y" are —$C_2H_4$— respectively, and "n" is 0. This resin will be hereinafter called as "ionizing radiation-curable resin B".

Preparation Example of Ionizing Radiation-Curable Resin C

Into a 2 liter four-necked flask equipped with a cooling condenser, a dropping funnel and a thermometer, 40 g of toluene, 40 g of methylethylketone (MEK), and an azo-type initiator were put. Next, a mixed solution consisting of 22.4 g of 2-hydroxyethylmethacrylate (HEMA), 70.0 g of methylmethacrylate (MMA), 20 g of toluene, and 20 g of MEK was dropped from the dropping funnel into the flask for about 2 hours at a temperature in a range of 100–110° C., and then the reaction was continued for eight hours at the same temperature range. Thereafter, the reaction mixture was cooled to a room temperature.

To this flask, a mixture consisting of 27.8 g of 2-isocyanate ethylmethacrylate (Show a Denko K.K., trademark: Carenz MOI), 20 g of toluene, and 26 g of MEK were added. Then dibutyltin laurylate was added to the flask as catalyst to proceed additional reactions. After confirmation of a disappearance of the 2200 $cm^{-1}$ absorbent peak, which is assigned to the isocyanate group, of the reaction product by IR analysis, the reaction was stopped. The resultant reaction mixture of this urethane modified acrylate resins contained non-volatile matter of 41.0% by weight. The molecular weight of the resin contained therein was 25,000, in terms of values measured by GPC using THF as solvent and standardized by standard polystyrene. This polymer had 13.8 mol % of an average amount of double bond per one molecule.

The resin obtained above had a structure of the formula (1) wherein "Z" is a moiety of isobornyl methacrylate, "$R^1$" and "$R^2$" are —$CH_3$ respectively, and "X" and "Y" are —$C_2H_4$— respectively, and "m" and "n" are 0 respectively. This resin will be hereinafter called as "ionizing radiation-curable resin C".

Next, the examples of preparing compositions to form the relief layer (inks) are described.

Preparation Example of Relief Layer Forming Composition(Ink) A

The composition having compounding ratio as shown below were diluted with methylethylketone (MEK) to prepare a relief layer forming composition(ink) A having 50% by weight in solid content ratio.

<Solid Content of Relief Layer Forming Composition A>

| | |
|---|---|
| Ionizing radiation-curable resin A: | 100 parts |
| Silicone (trimethylsiloxysilic acid-containing methylpolysiloxane) (trademark: KF-7312, Shin-Etsu Chemical Co., Ltd.): | 1 part |
| Polyfunctional urethane acrylate (Shikou UV1700B, Nichigou Gousei Chemical industries, Inc): | 25 parts |
| Photopolymerization initiator (trademark: Irgacure 907, Ciba Specialty Chemicals, Inc): | 5 parts |

Preparation Example of Relief Layer Forming Composition(Ink) B

The composition having compounding ratio as shown below were diluted with methylethylketone (MEK) to prepare a relief layer forming composition(ink) B having 50% by weight in solid content ratio.

<Solid Content of Relief Layer Forming Composition B>

| | |
|---|---|
| Ionizing radiation-curable resin B: | 100 parts |
| Amino modified reactive silicone oil (trademark: KF-860, Shin-Etsu Chemical Co., Ltd.): | 1 part |
| Dipentaerythritol monohydroxypentaacrylate (trademark: SR-399, Sartomer company, Inc): | 40 parts |
| Photopolymerization initiator (trademark: Irgacure 907, Ciba Specialty Chemicals, Inc): | 5 parts |

Preparation Example of Relief Layer Forming Composition(Ink) C

The composition having compounding ratio as shown below were diluted with methylethylketone (MEK) to prepare a relief layer forming composition(ink) C having 50% by weight in solid content ratio.

<Solid Content of Relief Layer Forming Composition C>

| | |
|---|---|
| Ionizing radiation-curable resin C: | 100 parts |
| Amino modified reactive silicone oil (one-end type) (trademark: KF-8012, Shin-Etsu Chemical Co., Ltd.): | 1 part |
| Dipentaerythritol monohydroxypentaacrylate (trademark: SR-399, Sartomer company, Inc): | 40 parts |
| Aluminum coupling agent (trademark: S-75P, Kawaken Fine Chemicals Co., Ltd): | 5 parts |
| Photopolymerization initiator (trademark: Irgacure 907, Ciba Specialty Chemicals, Inc): | 5 parts |

Next, the examples of preparing compositions to form the peelable layer (inks) are described.

Preparation Example of Peelable Layer Forming Composition(Ink) A

The composition having compounding ratio as shown below were diluted with methylethylketone (MEK) to prepare a peelable layer forming composition(ink) A having 50% by weight in solid content ratio.

<Solid Content of Peelable Layer forming Composition A>

| | |
|---|---|
| Ionizing radiation-curable resin A: | 100 parts |
| Silicone (trimethylsiloxysilic acid-containing methylpolysiloxane) (trademark: KF-7312, Shin-Etsu Chemical Co., Ltd.): | 1 part |
| Polyfunctional urethane acrylate (Shikou UV1700B, Nichigou Gousei Chemical industries, Inc): | 25 parts |
| Photopolymerization initiator (trademark: Irgacure 907, Ciba Specialty Chemicals, Inc): | 5 parts |
| Polyester as the thermoplastic resin (trademark: VYLON 29SS, Toyo boseki Co., Ltd): | 2 parts |

Preparation Example of Peelable Layer Forming Composition(Ink) B

The composition having compounding ratio as shown below were diluted with methylethylketone (MEK) to prepare a peelable layer forming composition(ink) B having 50% by weight in solid content ratio.

<Solid Content of Peelable Layer Forming Composition B>

| | |
|---|---|
| Ionizing radiation-curable resin B: | 100 parts |
| Amino modified reactive silicone oil (trademark: KF-860, Shin-Etsu Chemical Co., Ltd.): | 1 part |
| Dipentaerythritol monohydroxypentaacrylate (trademark: SR-399, Sartomer company, Inc): | 40 parts |
| Photopolymerization initiator (trademark: Irgacure 907, Ciba Specialty Chemicals, Inc): | 5 parts |
| Polyester as the thermoplastic resin (trademark: VYLON 200, Toyo boseki Co., Ltd): | 1 parts |

Preparation Example of Peelable Layer Forming Composition(Ink) C

The composition having compounding ratio as shown below were diluted with methylethylketone (MEK) to prepare a peelable layer forming composition(ink) C having 50% by weight in solid content ratio.

<Solid Content of Peelable Layer Forming Composition C>

| | |
|---|---|
| Ionizing radiation-curable resin C: | 100 parts |
| Amino modified reactive silicone oil (one-end type) (trademark: KF-8012, Shin-Etsu Chemical Co., Ltd.): | 1 part |
| Dipentaerythritol monohydroxypentaacrylate (trademark: SR-399, Sartomer company, Inc): | 40 parts |
| Aluminum coupling agent (trademark: S-75P, Kawaken Fine Chemicals Co., Ltd): | 5 parts |
| Photopolymerization initiator (trademark: Irgacure 907, Ciba Specialty Chemicals, Inc): | 5 parts |
| Vinyl chloride-vinyl acetate copolymer as the thermoplastic resin (trademark: Vinylight VYLF-X, available from UCC corporation): | 0.2 part |

Example A Series

Next, the transfer ribbons according to the present invention will be described in more detail with reference to the following Example A series.

Example A1

As a substrate, a polyethylene terephthalate film (trademark: F-53, Toray Industries, Inc.) with thickness of 6 μm is used, and a heat-resistant protection layer listed in the Table A1 was formed on one surface thereof prior to formation of a peelable layer.

Onto a surface of the substrate opposite to that having the heat-resistant protection layer, the peelable layer forming composition(ink) A was applied by means of a roll coater at a film speed of 50 m/min and then dried at 80° C. to form a peelability-potential layer with thickness of 0.5 μm in dried state.

Next, onto the peelability-potential layer, the relief layer forming composition(ink) A was applied by means of a gravure reverse coater at a film speed of 50 m/min and then dried at 100° C. to form a relief forming layer with thickness of 0.5 μm in dried state. The obtained film was not adhesive at ambient temperature, and accordingly it could be stored or processed in its rolled state.

On the other hand, a stamper was prepared by duplicating, through the 2P Method, from a master hologram which had been made with the use of laser beam. The prepared stamper was attached to an emboss roller of a duplicating apparatus, and the emboss roller was positioned in the duplicating apparatus so as to face with a press roller.

Then the film having the relief forming layer was supplied between the emboss roller and the press roller heated at a temperature of 150° C. to subjected to a heat-pressing process for forming a relief with fine convex-concave pattern. In this way, the embossing process was carried out by pressing a stamper on the relief forming layer to form a surface thereof into a relief configuration.

Just after the relief duplication, the film was irradiated with an ultraviolet ray which was almost eliminated wavelength in a region of 300 nm or lower by means of a high-pressure mercury lamp equipped with an output window of the Pyrex (trademark) glass (wavelength selectable filter, hereafter it is also called as a "wavelength cut filter".) for output of ultraviolet light, thereby fixing the relief configuration. In this way, the relief forming layer and the peelability-potential layer were cured and converted to a relief layer and a peelable layer respectively.

Next, aluminum was deposited at thickness of 30 nm on a surface of the relief layer by vacuum vapor deposition to form a reflection type relief hologram. Thereafter, An adhesive consisting of a vinyl chloride-vinyl acetate copolymer was further applied to the relief surface through the reflection layer by gravure coating, and then dried at 100° C. to form an adhesive layer having thickness of 0.2 μm, thus obtaining a transfer ribbon of Example A1.

Example A2–A15 and Comparative Example a1–a6

The transfer ribbons of Examples A2–A15 and Comparative Examples a1, a3 and a5 were produced in the same manner as that in the Example A1 except that materials and conditions were partly changed as shown in the Tables A1–A3.

The transfer ribbons of Comparative Examples a2, a4 and a6 were also produced in the same manner as that in the Example A1 except that materials and conditions were partly changed as shown in the Tables A1–A3. In the Comparative Examples a2, a4 and a6, a high-pressure mercury lamp which was not equipped with the wavelength cut filter as the output window was particularly used, and therefore the relief forming layers were irradiated with an ultraviolet ray containing wavelength in a region of 300 nm or lower.

In the Table A1–A3, a polyimide-type and a styrene-type heat-resistant protection layer have thickness of 1 μm in dried state, and they were formed from any one of coating liquid having composition described bellow by the gravure reverse coating method.

<Polyimide-Type Heat-Resistant Protection Layer>

| | |
|---|---|
| Polyimide resin: | 20 parts |
| Toluene/Methylethylketone (1/1) solution: | 80 parts |

<Styrene-Type Heat-Resistant Protection Layer>

| | |
|---|---|
| Styrene-acrylonitrile copolymer (trademark: CAVIAN, Daicel Chemical Industries Ltd): | 18 parts |
| Polyester resin (trademark: ERITEL, Unitika LTD): | 1 part |
| Zinc stearyl phosphate (trademark: LBT-1830, SAKAI CHEMICAL INDUSTRY CO., LTD.): | 2 parts |
| Toluene/Methylethylketone(1/1) solution: | 80 parts |

TABLE A1

| | | EXAMPLE | | | | | | |
| --- | --- | --- | --- | --- | --- | --- | --- | --- |
| | | A1 | A2 | A3 | A4 | A5 | A1 | a2 |
| HEAT RESISTANT PROTECTION LAYER | MATERIAL THICKNESS | styrenes 1 μm | polyimide 1 μm | styrenes 1 μm | polyimide 1 μm | polyimide 1 μm | styrenes 1 μm | polyimide 1 μm |
| SUBSTRATE | MATERIAL THICKNESS | PET 6 μm | PET 6 μm | PET 6 μm | PET 6 μm | PET 4.5 μm | PET 6 μm | PET 6 μm |
| PEELABLE LAYER FORMING COMPOSITION | | Ink A | Ink A but thermoplastic resin 0.2 parts | Ink A but thermoplastic resin 5 parts | Ink A | Ink A but thermoplastic resin 13 parts | Ink A but thermoplastic resin 20 parts | Ink A |
| RELIEF FORMING LAYER | COMPOSITION IONIZING RADIATION RAY | A High-pressure mercury lamp1 with filter | B Metal halide lamp with filter | C High-pressure mercury lamp with filter | A High-pressure mercury lamp with filter | B High-pressure mercury lamp with filter | A High-pressure mercury lamp with filter | A High-pressure mercury lamp without filter |
| REFLECTING LAYER | MATERIAL | Al | Al | Al | ZnS | Al | Al | Al |
| EVALUATION | BUR LACK | A A | A A | A A | A A | A A | A C | C C |

TABLE A2

| | | EXAMPLE | | | | | | |
| --- | --- | --- | --- | --- | --- | --- | --- | --- |
| | | A6 | A7 | A8 | A9 | A10 | a3 | a4 |
| HEAT RESISTANT PROTECTION LAYER | MATERIAL THICKNESS | styrenes 1 μm | polyimide 1 μm | styrenes 1 μm | polyimide 1 μm | polyimide 1 μm | styrenes 1 μm | polyimide 1 μm |
| SUBSTRATE | MATERIAL THICKNESS | PET 6 μm | PET 6 μm | PET 6 μm | PET 6 μm | PET 4.5 μm | PET 6 μm | PET 6 μm |
| PEELABLE LAYER FORMING COMPOSITION | | Ink B | Ink B but thermoplastic resin 0.2 parts | Ink B but thermoplastic resin 5 parts | Ink B | Ink B but thermoplastic resin 15 parts | Ink B but thermoplastic resin 30 parts | Ink B |
| RELIEF FORMING LAYER | COMPOSITION IONIZING RADIATION RAY | A High-pressure mercury lamp with filter | B High-pressure mercury lamp with filter | C Metal halide lamp with filter | A High-pressure mercury lamp with filter | B High-pressure mercury lamp with filter | A High-pressure mercury lamp with filter | A High-pressure mercury lamp without filter |
| REFLECTION LAYER | MATERIAL | Al | Al | Al | $TiO_2$ | Al | Al | Al |
| EVALUATION | BURR CHIPPING | A A | A A | A A | A A | A A | A C | C C |

TABLE A3

| EXAMPLE | | A11 | A12 | A13 | A14 | A15 | a5 | a6 |
| --- | --- | --- | --- | --- | --- | --- | --- | --- |
| HEAT RESISTANT PROTECTION LAYER | MATERIAL THICKNESS | styrenes 1 μm | polyimide 1 μm | styrenes 1 μm | polyimide 1 μm | polyimide 1 μm | styrenes 1 μm | polyimide 1 μm |
| SUBSTRATE | MATERIAL THICKNESS | PET 6 μm | PET 6 μm | PET 4.5 μm | PET 6 μm | PET 4.5 μm | PET 6 μm | PET 6 μm |
| PEELABLE LAYER FORMING COMPOSITION | | Ink C | Ink C but thermoplastic resin 5 parts | Ink C but thermoplastic resin 10 parts | Ink C | Ink C but thermoplastic resin 15 parts | Ink C but thermoplastic resin 20 parts | Ink C |

TABLE A3-continued

| EXAMPLE | | A11 | A12 | A13 | A14 | A15 | a5 | a6 |
|---|---|---|---|---|---|---|---|---|
| RELIEF FORMING LAYER | COMPOSITION | A | B | C | A | B | A | A |
| | IONIZING RADIATION RAY | High-pressure mercury lamp with filter | Metal halide lamp with filter | High-pressure mercury lamp with filter | High-pressure mercury lamp with filter | High-pressure mercury lamp with filter | High-pressure mercury lamp with filter | High-pressure mercury lamp without filter |
| REFLECTION LAYER | MATERIAL | Al | Al | Al | ZnS | Al | Al | Al |
| EVALUATION | BURR | A | A | A | A | A | A | C |
| | CHIPPING | A | A | A | A | A | C | C |

Example A16

As a substrate, a polyethylene terephthalate film (trademark: F-53, Toray Industries, Inc.) with thickness of 6 μm is used, and a heat-resistant protection layer listed in the Table A4 was formed on one surface thereof prior to formation of a relief layer.

Onto a surface of the substrate opposite to that having the heat-resistant protection layer, the relief layer forming composition(ink) A was applied by means of a gravure reverse coater at a film speed of 50 m/min and then dried at 100° C. to form a relief forming layer with thickness of 1 μm in dried state.

On the other hand, a stamper was prepared by duplicating, through the 2P Method, from a master diffraction grating which had been made with the use of electron beam. The prepared stamper was attached to an emboss roller of a duplicating apparatus, and the emboss roller was positioned in the duplicating apparatus so as to face with a press roller.

Then the film having the relief forming layer was supplied between the emboss roller and the press roller heated at a temperature of 150° C. to subjected to a heat-pressing process for forming a relief of the diffraction grating with fine convex-concave pattern. In this way, the embossing process was carried out by pressing a stamper on the relief forming layer to form a surface thereof into a relief configuration.

Just after the relief duplication, the film was irradiated with an ultraviolet ray which was almost eliminated wavelength in a region of 300 nm or lower by means of a high-pressure mercury lamp equipped with an output window of the Pyrex (trademark) glass (namely, the wavelength cut filter) for output of ultraviolet light, thereby fixing the relief configuration. In this way, the relief forming layer was cured and converted to a relief layer.

Next, aluminum was deposited at thickness of 30 nm on a surface of the relief layer by vacuum vapor deposition to form a reflection type diffraction grating. Thereafter, an adhesive consisting of a vinyl chloride-vinyl acetate copolymer was further applied to the relief surface through the reflection layer by gravure coating, and then dried at 100° C. to form an adhesive layer having thickness of 0.2 μm, thus obtaining a transfer ribbon of Example A11.

Example A17 and Comparative Example a7

The transfer ribbon of Example A17 was produced in the same manner as that in the Example A16 except that materials and conditions were partly changed as shown in the Table A4.

The transfer ribbons of Comparative Example a7 was also produced in the same manner as that in the Example A16 except that materials and conditions were partly changed as shown in the Table A4. In the Comparative Examples a7, a high-pressure mercury lamp which was not equipped with the wavelength cut filter as the output window was particularly used, and therefore the relief forming layers were irradiated with an ultraviolet ray containing wavelength in a region of 300 nm or lower.

TABLE A4

| EXAMPLE | | A16 | A17 | a7 |
|---|---|---|---|---|
| HEAT RESISTANT PROTECTION LAYER | MATERIAL | polyimide | polyimide | polyimide |
| | THICKNESS | 1 μm | 1 μm | 1 μm |
| SUBSTRATE | MATERIAL | PET | PET | PET |
| | THICKNESS | 6 μm | 9 μm | 9 μm |
| PEELABLE LAYER FORMING COMPOSITION | | NON | NON | NON |
| RELIEF FORMING LAYER | COMPOSITION | A | A | A |
| | IONIZING RADIATION RAY | High-pressure mercury lamp with filter | High-pressure mercury lamp with filter | High-pressure mercury lamp without filter |
| REFLECTION LAYER | MATERIAL | Al | Al | Al |
| EVALUATION | BURR | B | A | C |
| | CHIPPING | A | A | C |

Evaluation of Example A Series

A thermal printer equipped with a line type thermal head (300 dpi, 4500Ω) employing a heat meltable ink ribbon was used for evaluation of the transferability (printing ability). Evaluation was done regarding the burrs and the chipping.

<Evaluation Regarding Burrs>

For the evaluation of burrs, a printing processes was carried out to form a dot-pattern in which dots each having an area of 0.04 mm² were placed so as to border on each other in a right-angled grid arrangement. After the printing test, the resultant dots were observed and evaluated regarding the burrs in light of the following criteria.

<Criteria of Burr-Evaluation>

Level-A: "Good", that is, no burr was formed around the dots.

Level-B: "Medium", that is, a little burrs were formed around the dots, but regions (gaps) between the dots were not filled with the burrs, and no problem was caused for the practically use.

Level-C: "Poor", that is, the burrs were formed around the dots, and regions (gaps) between the dots were filled with the burrs.

<Evaluation Regarding Chipping>

For the evaluation of chipping, a printing processes was carried out to form a dot-pattern in which dots each having an area of 0.25 mm$^2$ were arranged so as to set the total percentage of area covered (occupied) with the dots to 30%. After the printing test, the resultant dots were observed and evaluated regarding the chipping in light of the following criteria.

<Criteria of Chipping-Evaluation>

Level-A: "Good", that is, no chipping was caused around the dots.

Level-B: "Medium", that is, a little chippings were formed around the dots, but no problem was caused for the practically use.

Level-C: "Poor", that is, the chippings were formed around the dots.

As a result, when the transfer ribbons in the Examples A1–A15 were used for the thermal printing process by means of a thermal printer equipped with a thermal head, dots having minute areas and/or dots placed close to each other were transferred without chipping nor burrs. However, the transfer ribbons in the Comparative Examples a1, a3 and a5 caused chippings of the transferred dots, and the transfer ribbons in the Comparative Examples a2, a4 and a6 caused chippings and burrs of the transferred dots, and they were evaluated as unacceptable.

In a case of using the transfer ribbon in the Example A16, the burrs of the dots were made a little, but it caused no problem for the practical use, and no chipping was made. In a case of using the transfer ribbon in the Example A17, any burrs nor any lacks was caused, and thus it was evaluated as acceptable. To the contrary, in a case of using the transfer ribbon in the Comparative Examples a7, the burrs and the chippings of the dots were made, and thus it was evaluated as unacceptable.

Example B Series

Next, the image expressing medium according to the present invention will be described in more detail with reference to the following Example B series.

First, the example of preparing transfer ribbon which was used in the Example B series is described.

Preparation Example of Transfer Ribbon

Onto a surface which had been subjected to the adhesion-facilitating treatment of the polyethylene terephthalate film (trademark: F-53, Toray Industries, Inc.) with thickness of 6 μm, the peelable layer forming composition(ink) A was applied by means of a roll coater at a film speed of 100 m/min, and then dried at 80° C. to form a peelability-potential layer with thickness of 0.5 μm in dried state.

Next, onto the peelability-potential layer, the relief layer forming composition(ink) A was applied by means of a gravure reverse coater at a film speed of 50 m/min, and then dried at 100° C. to form a relief forming layer with thickness of 0.5 μm in dried state. The obtained film was not adhesive at ambient temperature, and accordingly it could be stored or processed in its rolled state.

On the other hand, a stamper was prepared by duplicating, through the 2P Method, from a master relief. The master relief had been made, in advance, with the use of master diffraction grating provided with diffraction gratings drawn by electron beam, in which the diffraction gratings defined by 50 μm-square unit are repeatedly arranged in a horizontal direction so as to not accord their diffraction direction with that of any their adjacent.

The prepared stamper was attached to an emboss roller of a duplicating apparatus, and the emboss roller was positioned in the duplicating apparatus so as to face with a press roller.

Then the film having the relief forming layer was supplied between the emboss roller and the press roller heated at a temperature of 150° C. to subjected to a heat-pressing process for forming a relief of the diffraction grating with fine convex-concave pattern. In this way, the embossing process was carried out by pressing a stamper on the relief forming layer to form a surface thereof into a relief configuration.

Just after the relief duplication, the film was irradiated with an ultraviolet ray which was almost eliminated wavelength in a region of 300 nm or lower by means of a high-pressure mercury lamp equipped with an output window of the Pyrex (trademark) glass (namely, the wavelength cut filter) for output of ultraviolet light, thereby fixing the relief configuration. In this way, the relief forming layer was cured and converted to a relief layer.

Next, aluminum was deposited at thickness of 30 nm on a surface of the relief layer by vacuum vapor deposition to form a reflection type diffraction grating. Thereafter, an adhesive consisting of a vinyl chloride-vinyl acetate copolymer was further applied to the relief surface through the reflection layer by gravure coating, and then dried at 100° C. to form an adhesive layer having thickness of 0.2 μm, thus obtaining a transfer ribbon.

The transfer ribbon was slitted to desired width, then the slitted ribbon is installed in a cassette. In this way, the transfer ribbon cassette was obtained.

Example B1

The transfer ribbon cassette which had been obtained by the way described above was installed in an ordinary thermal printer (300 dpi). On the other hand, color layers were previously formed on a support of an image expressing medium by the sublimation thermal transfer method. Then dots each having an area of 0.017 mm$^2$ was transferred from the transfer ribbon onto the color layers of the support, thus obtaining an image expressing medium shown in FIG. 12-A.

Example B2–B4 and Comparative Example b1–b3

The image expressing mediums of the Example B2–B4 and the Comparative Example b1–b3 were produced in the same manner as that in the Example B1 except that the areas of dots and dot patterns were changed as shown in the Table B1.

Example B5–B7

The image expressing mediums of the Example B5–B7 were produced in the same manner as that in the Example B1 except that the areas of dots and dot patterns were changed as shown in the Table B2.

TABLE B1

| EXAMPLE | | B1 | B2 | B3 | B4 | b1 | b2 | b3 |
|---|---|---|---|---|---|---|---|---|
| DOT AREA (mm$^2$) | | 0.014 | 0.09 | 0.026 | 0.004 | 1.4 | 0.12 | 0.00008 |
| PERCENTAGE OF TOTAL AREA COVERED WITH TRANSFERRED DOTS per RECEPTIVE SURFACE | | 25% | 25% | 25% | 25% | 25% | 60% | 25% |
| | DOT PATTERN | FIG. 12-A | FIG. 12-B | FIG. 12-B | FIG. 12-A | FIG. 12-B | FIG. 12-C | FIG. 12-A |
| EVALUATION | LAME-LIKE EFFECT | A | A | A | A | B | B | C |
| | VISIBILITY OF COLOR LAYER | A | A | A | A | B | B | A |
| | QUALITY OF HOLOGRAM DESIGN | A | A | A | A | A | A | C |

TABLE B2

| | | Example | | |
|---|---|---|---|---|
| | | B5 | B6 | B7 |
| DOT AREA (measured value, mm$^2$) | | 0.017 and 0.12 (coexistent) | Combination of 0.017 (0.051) | Combination of 0.03 (0.15) and 0.012 (coexistent) |
| | DOT PATTERN | FIG. 12-D | FIG. 12-E | FIG. 12-F |
| EVALUATION | LAME-LIKE EFFECT | A | A | A |
| | VISIVILITY OF COLOR LAYER | A | A | A |
| | QUALITY OF HOLOGRAM DESIGN | A | A | A |

Evaluation of Example B Series

The image expressing mediums thus obtained were evaluated regarding the lame-like effect, visibility of the color layer, and quality of hologram design.

<Evaluation Regarding Lame-Like Effect>

The image expressing medium was observed by naked eyes, and evaluated regarding the lame-like effect in light of the following criteria.

<Criteria of Lame-Like Effect>

Level-A: "Good", that is, the lame-like effect was present.

Level-B: "Medium", that is, the obtained lame-like effect was inferior to Level-A, but no problem was caused for the practically use.

Level-C: "Poor", that is, the lame-like effect was not present.

<Evaluation Regarding Visibility of Color Layer>

The image expressing medium was observed by naked eyes, and evaluated regarding the visibility of the color layer in light of the following criteria.

<Criteria of Visibility of Color Layer>

Level-A: "Good", that is, presence of the color layer was clearly recognized.

Level-B: "Medium", that is, the obtained visibility was inferior to Level-A, but no problem was caused for the practically use.

Level-C: "Poor", that is, presence of the color layer was not clearly recognized.

<Evaluation Regarding Quality of Hologram Design>

The image expressing medium was observed by naked eyes, and evaluated regarding the quality of hologram design in light of the following criteria.

<Criteria of Quality of Hologram Design>

Level-A: "Good", that is, the quality of hologram design was far excellent.

Level-B: "Medium", that is, the quality of hologram design was excellent.

Level-C: "Poor", that is, the quality of hologram design was not so excellent.

Results of the evaluations were shown in lower rows of the Tables B1 and B2.

The image expressing medium of the Examples B1–B3 and B5–B7 exhibited lame-like effects in a part or entire of a receptive surface, and caused no problem in the visibilities of the color layer and the quality of hologram design.

Though the image expressing medium of the Example B4 showed somewhat inferior lame-like effect than the Examples B1–B3 and B5–B7, it was enough for practical use, and there was no problem in the visibilities of the color layer and the quality of hologram design.

To the contrary, the image expressing medium of the Comparative Examples b1 and b2 were insufficient in the lame-like effect, and somewhat inferior in the visibilities of the color layer.

The image expressing medium of the Comparative Example b3 was insufficient in the lame-like effect and the quality of hologram design.

As mentioned above, the the transfer ribbons according to the present invention can transfer dots having minute areas or dots arranged close to each other without any problems such as burrs, lacks and chipping of dots even in a case of using a thermal printer provided with a thermal head.

The transfer ribbons according to the present invention can also transfer precise dots at a high speed with a low energy even in a case of using a thermal printer provided with a thermal head.

Further, since the thermal head can be used to heat the transfer ribbons of the present invention, the transfer ribbons can easily transfer the variable information such as letters, characters, figures, numerals, illustrations or the like, and it is therefore applicable to the on-demand recording systems.

When the transfer ribbons according to the present invention is used, various images such as specially decorated images, three-dimensional images and glittering images can be expressed by means of a thermal head. It is also the advantageous effect of the present invention. These images can also be applicable to prevention of forgery or falsification because the hologram and the diffraction grating require high technology for producing themselves and they are therefore difficult to be produced. The image which provides specially visual effects as mentioned above can be produced by precisely transferring dots of relief at a high speed, and in this case, the dots can be transferred to a transfer-receiving material which has no adhesive layer on its receptive surface.

The method for production of the transfer ribbons of the present invention provide the transfer ribbons which can precisely transfer dots having minute areas or dots arranged close to each other without any problems such as burrs, lacks and chipping of dots with a low energy at a high speed, and can exhibit stable peelability, even when the thermal printing process is carried out by means of a thermal printer provided with a thermal head.

The image expressing medium according to the present invention, exhibits a visually unique decoration-effect such as lame-like effect by synergistic effect between the color layers and plurality of fine dots. In the present invention, a frame of an image such as pattern or photograph on the image expressing medium can be made so as to have gradation design or various figures depending on arrangement and/or combination of dots, so that the image expressing medium can also provide a high quality design.

Furthermore, according to the method for the production of the image expressing medium of the present invention, fine dots without any of burrs, chippings and lacks can be easily transferred by an ordinary thermal printer, and the thermal transfer process does not need numbers of transfer ribbons, and therefore the image expressing medium can be produced through a minimum transfer cycles.

On a course of producing the image expressing medium, variable patterns or arrangements of the dots can be transferred to individual medium, and the method is applicable to an on-demand transfer system capable of transferring a variable information on real time.

What is claimed is:

1. A transfer ribbon comprising a substrate, a relief layer having a surface configuration of relief patterns and a reflection layer, wherein the substrate, the relief layer and the reflection layer are disposed on the substrate in this order, and the relief layer comprises an ionizing radiation-cured resin.

2. A transfer ribbon according to claim 1, wherein a peelable layer comprising the substantially same ionizing radiation-cured resin as that of the relief layer is further disposed between the substrate and the relief layer.

3. A transfer ribbon according to claim 2, wherein the peelable layer further comprises a thermoplastic resin.

4. A transfer ribbon according to claim 3, wherein the peelable layer comprises 90 to 99.9% by weight of the ionizing radiation-cured resin and the 0.1 to 10% by weight of the thermoplastic resin.

5. A transfer ribbon according to claim 3, wherein the thermoplastic resin comprises at least one resin selected from the group consisting of polyester resins and copolymer resins containing a monomer unit derived from vinyl chloride and/or vinyl acetate.

6. A transfer ribbon according to claim 1, wherein a heat resistant layer is disposed on the opposite side of the substrate to the side having the relief layer.

7. A transfer ribbon according to claim 1, wherein an adhesive layer is further disposed on the reflection layer.

8. A method for production of a transfer ribbon comprising a substrate, a relief layer having a surface configuration of relief patterns and a reflection layer, the relief layer and the reflection layer being disposed on the substrate in this order, comprising steps of:
  (a) forming a relief forming layer comprising an ionizing radiation-curable resin on the substrate,
  (b) forming a surface of the relief forming layer into the relief patterns,
  (c) converting the relief forming layer to the relief layer by irradiating and curing the relief forming layer with an ionizing radiation, and
  (d) forming the reflection layer on the relief layer.

9. A method for production of a transfer ribbon according to claim 8, wherein a peelability-potential layer comprising the substantially same ionizing radiation-curable resin as that of the relief forming layer and a thermoplastic resin is formed on the substrate prior to the step (a), the relief forming layer is formed on the peelability-potential layer in the step (a), and the peelability-potential layer is converted to a peelable layer as well as conversion from the relief forming layer to the relief layer by irradiating and curing the peelability-potential layer and the relief forming layer with an ionizing radiation in the step (c).

10. A method for production of a transfer ribbon according to claim 8, wherein the ionizing radiation is an ultraviolet ray substantially having a wavelength only in a range longer than 300 nm.

11. An image expressing medium comprising a support, a color layer and plural dots of relief hologram and/or diffraction grating, the color layer and the dots being disposed on the same surface of the support, wherein the dots has a layered structure comprising a reflection layer and a relief layer having a surface configuration of relief patterns, the each dot has an area in a range from 0.0001 to 0.09 mm$^2$, and has a diffraction direction different from that of at least one of adjacent dots or two or more sections each of which has a diffraction direction different from each other.

12. An image expressing medium according to claim 11, wherein two or more kinds of the dots different in area are present.

13. An image expressing medium according to claim 11, wherein the dots are arranged with a gradient in a density of the dots.

14. A method for production of an image expressing medium comprising steps of:
  providing a support provided with a color layer disposed on a surface of the support,
  providing a transfer ribbon in which a relief layer having a surface configuration of relief patterns and a reflection layer are disposed on a substrate in this order, and the relief layer comprises an ionizing radiation-cured resin,
  subjecting the support to thermal transfer with the use of the transfer ribbon by means of a thermal head to form plural dots of relief hologram and/or diffraction grating on the same surface where the color layer is disposed on so as that the each dot has a layered structure comprising a reflection layer and a relief layer, and has an area in a range from 0.0001 to 0.09 mm$^2$, and has a diffraction direction different from that of at least one of adjacent dots or two or more sections each of which has a diffraction direction different from each other.

15. A method for production of an image expressing medium according to claim 14, wherein the transfer ribbon further comprises a peelable layer which is disposed between the substrate and the relief layer, and comprises the substantially same ionizing radiation-cured resin as that of the relief layer.

16. A method for production of an image expressing medium according to claim 15, wherein the peelable layer further comprises a thermoplastic resin.

17. A method for production of an image expressing medium according to claim 16, wherein the peelable layer comprises 90 to 99.9% by weight of the ionizing radiation-cured resin and the 0.1 to 10% by weight of the thermoplastic resin.

18. A method for production of an image expressing medium according to claim 16, wherein the thermoplastic resin comprises at least one resin selected from the group consisting of polyester resins and copolymer resins containing a monomer unit derived from vinyl chloride and/or vinyl acetate.

19. A method for production of an image expressing medium according to claim 14, wherein the transfer ribbon further comprises a heat resistant layer disposed on the opposite side of the substrate to the side having the relief layer.

20. A method for production of an image expressing medium according to claim 14, wherein the transfer ribbon further comprises an adhesive layer disposed on the reflection layer.

* * * * *